(12) United States Patent
Aronoff et al.

(10) Patent No.: US 10,469,427 B2
(45) Date of Patent: Nov. 5, 2019

(54) METHODS AND SYSTEMS FOR TRANSMITTING A VIDEO AS AN ASYNCHRONOUS ARTIFACT

(71) Applicant: Facebook, Inc., Menlo Park, CA (US)

(72) Inventors: Brendan Benjamin Aronoff, San Francisco, CA (US); Stephane Taine, Issaquah, WA (US)

(73) Assignee: FACEBOOK, INC., Menlo Park, CA (US)

( * ) Notice: Subject to any disclaimer, the term of this patent is extended or adjusted under 35 U.S.C. 154(b) by 267 days.

(21) Appl. No.: 15/346,354

(22) Filed: Nov. 8, 2016

(65) Prior Publication Data

US 2018/0131732 A1 May 10, 2018

(51) Int. Cl.
| | | |
|---|---|---|
| G06F 15/16 | (2006.01) | |
| H04L 12/58 | (2006.01) | |
| G06Q 10/10 | (2012.01) | |
| H04L 29/06 | (2006.01) | |
| G06Q 50/00 | (2012.01) | |

(52) U.S. Cl.
CPC .......... *H04L 51/16* (2013.01); *G06Q 10/107* (2013.01); *G06Q 50/01* (2013.01); *H04L 51/10* (2013.01); *H04L 65/1059* (2013.01); *H04L 65/4069* (2013.01)

(58) Field of Classification Search
CPC ...... G06Q 10/107; G06Q 50/01; H04L 51/10; H04L 65/1059; H04L 65/4069
USPC ....................................................... 709/204
See application file for complete search history.

(56) References Cited

U.S. PATENT DOCUMENTS

| | | | |
|---|---|---|---|
| 2003/0041333 A1* | 2/2003 | Allen ..................... | H04N 5/76 725/106 |
| 2010/0027777 A1* | 2/2010 | Gupta ............... | H04M 3/42195 379/210.01 |
| 2012/0287225 A1* | 11/2012 | Ramadass .............. | H04N 7/144 348/14.08 |
| 2013/0027504 A1* | 1/2013 | Zhang ................. | H04L 12/1827 348/14.08 |
| 2013/0179494 A1* | 7/2013 | Chakravarthy ...... | G06Q 10/101 709/203 |
| 2014/0066035 A1* | 3/2014 | Melin ..................... | H04W 4/16 455/416 |
| 2017/0026333 A1* | 1/2017 | Pitroda .................. | H04L 51/14 |

* cited by examiner

*Primary Examiner* — Wing F Chan
*Assistant Examiner* — Joseph R Maniwang

(57) ABSTRACT

Exemplary embodiments relate to techniques for sharing live video while maintaining an asynchronous copy of the video. According to some embodiments, a user begins to record video and shares the video with selected other users. If one of the other users opts to join the original user, the shared video upgrades to a live video conversation. If no one (or only some participants) joins the original user, the recorded video becomes an asynchronous artifact in the users' messaging history. In some embodiments, the live video may be recorded and shared in response to a first user initiating a video call with at least a second user, but receiving no answer. The first user begins to share a live video (which may become an asynchronous artifact). If the second user joins the call while the video is being recorded, the conversation may upgraded to a video conversation.

14 Claims, 21 Drawing Sheets

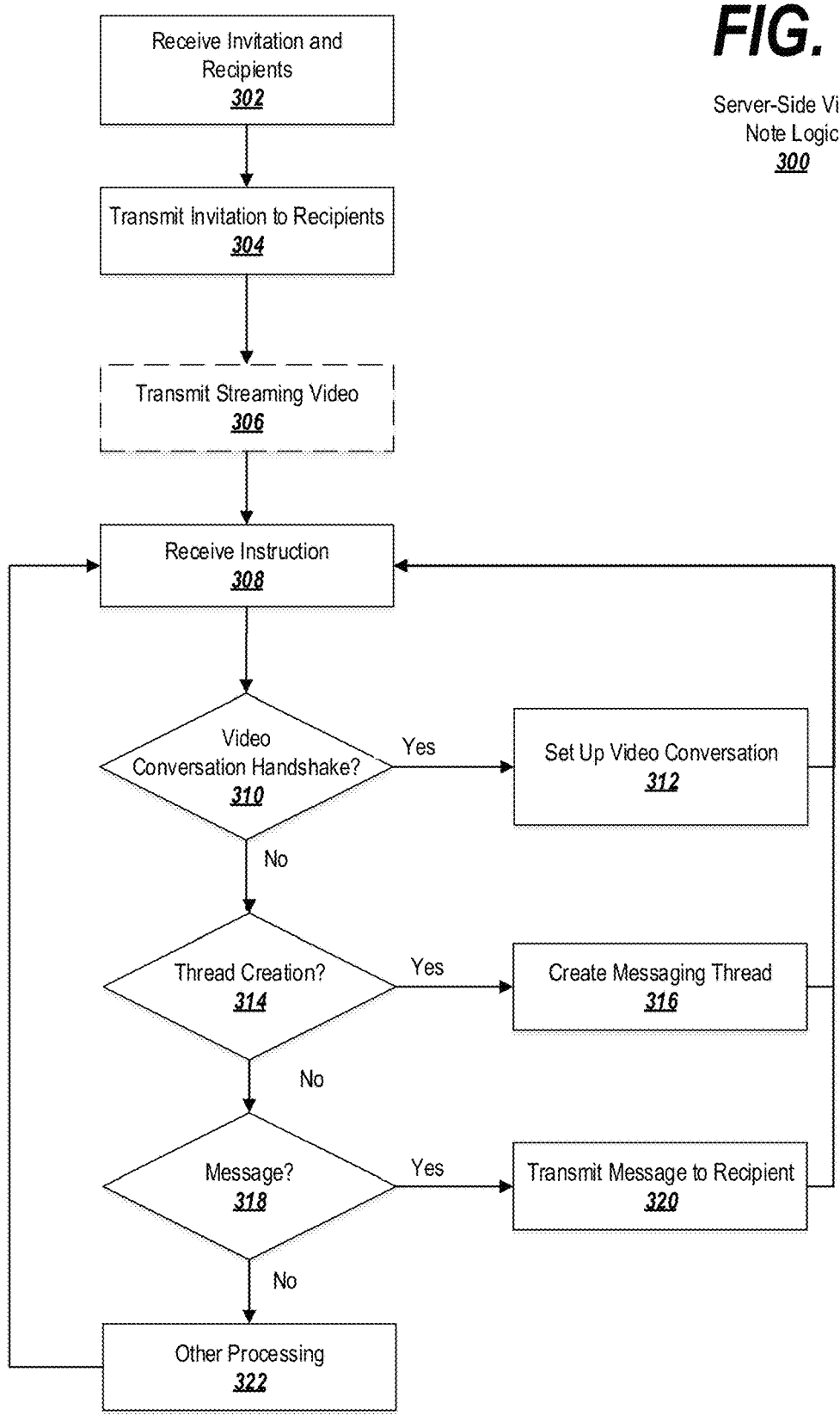

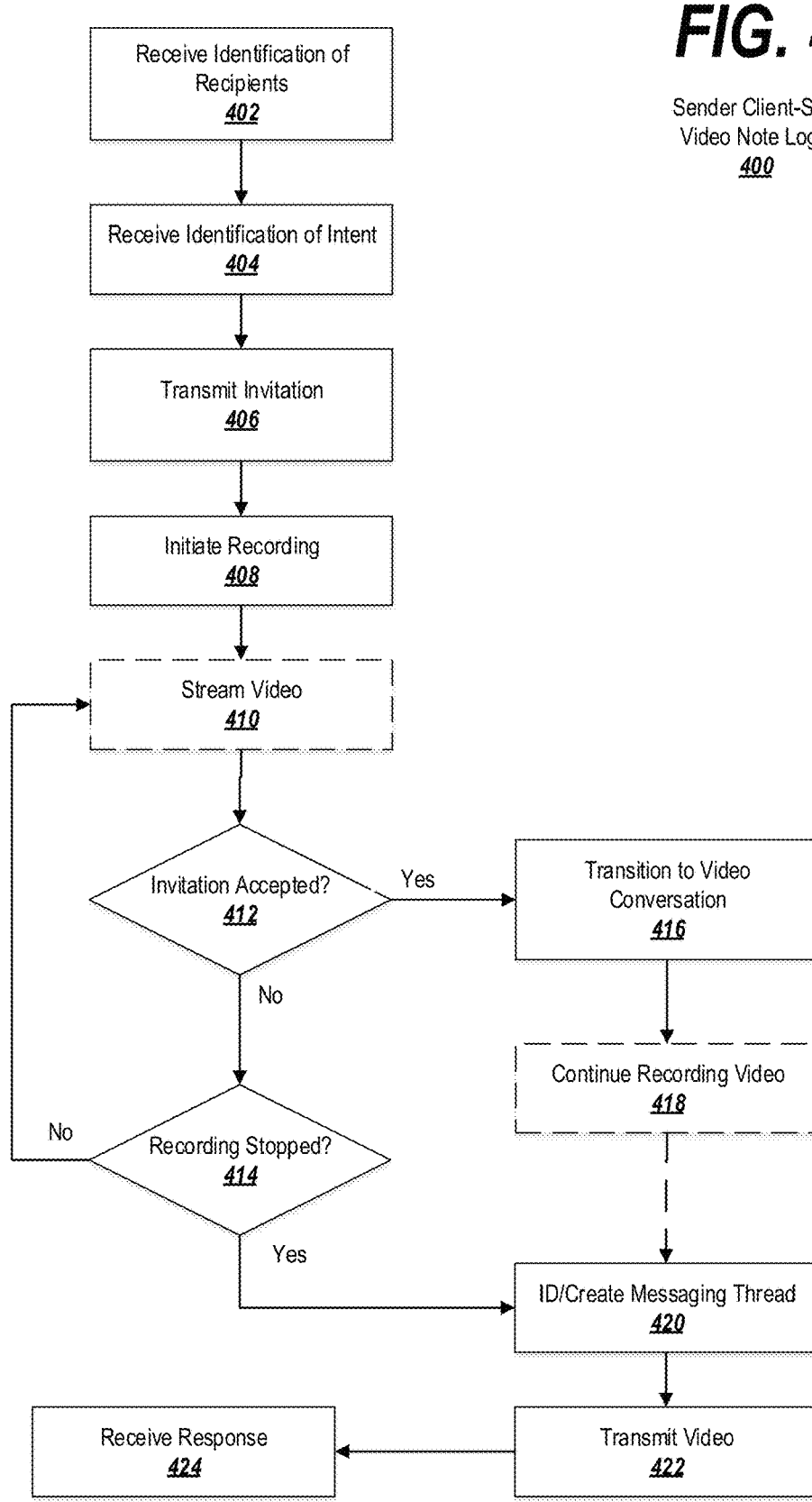

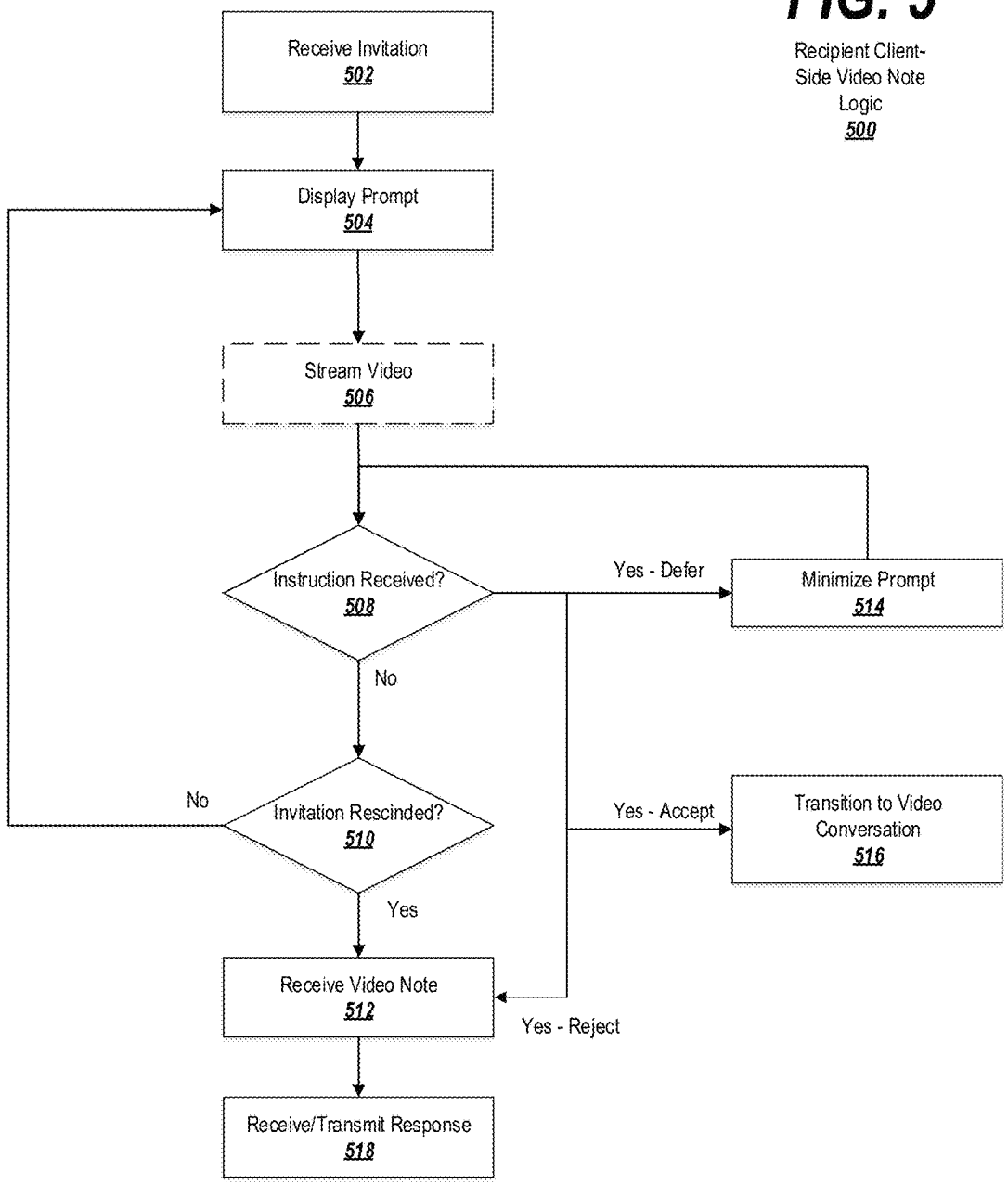

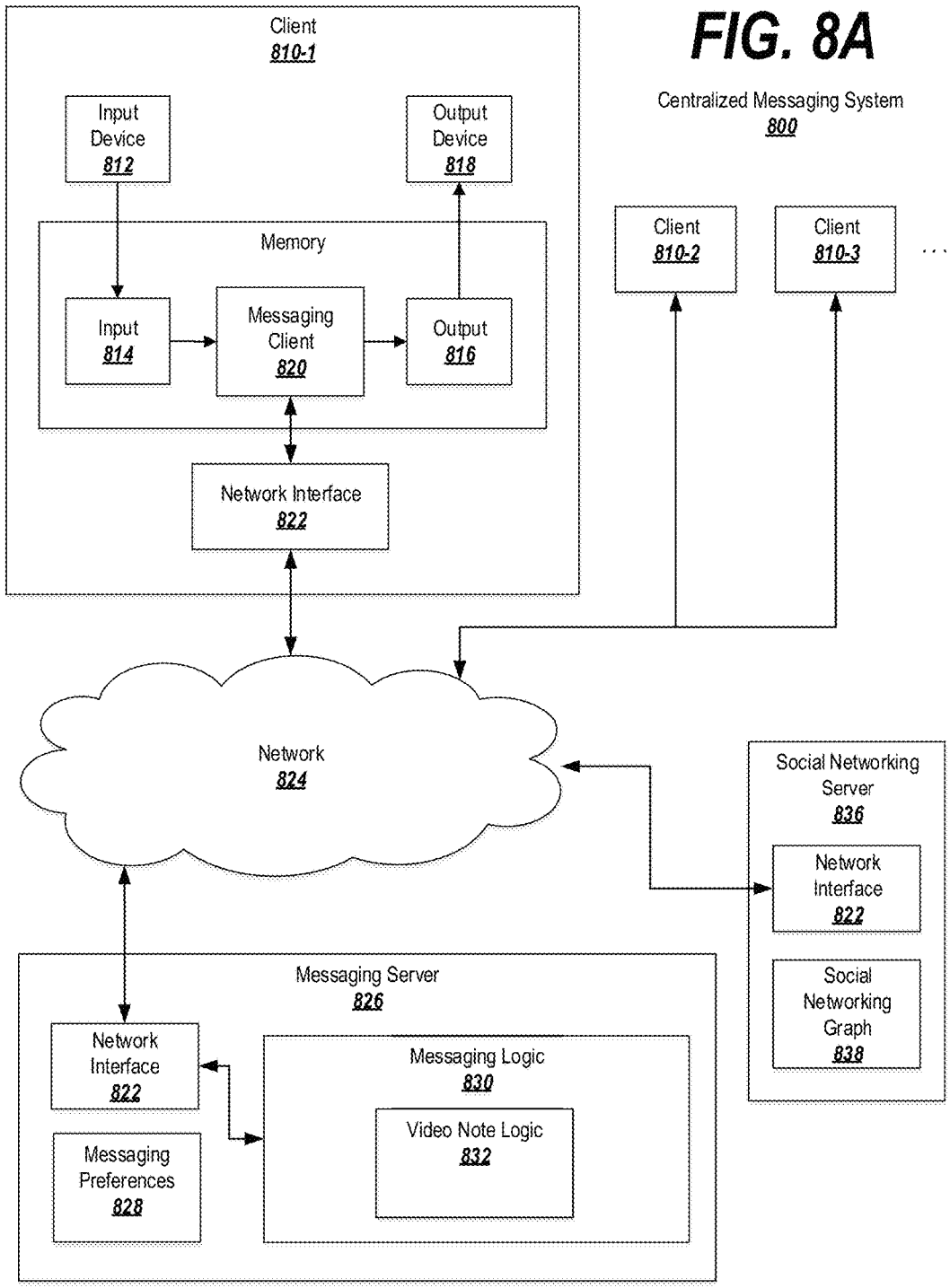

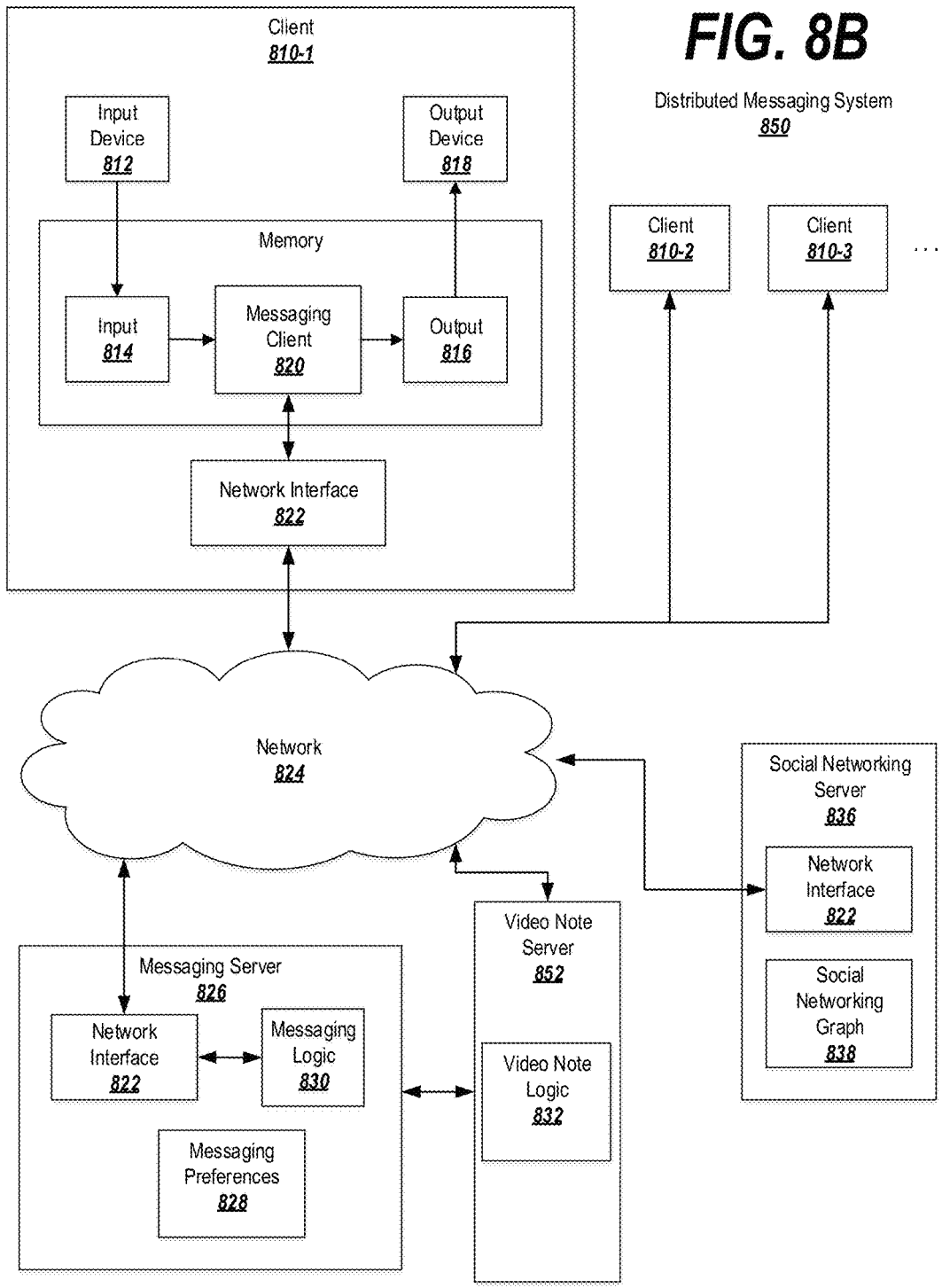

METHODS AND SYSTEMS FOR TRANSMITTING A VIDEO AS AN ASYNCHRONOUS ARTIFACT

BACKGROUND

Communications systems allow two or more users to communicate by exchanging text, audio, video, or other forms of communications. Communications systems may allow users to communicate synchronously (e.g., a real-time conversation) or asynchronously (e.g., a conversation in which a sender leaves a message for later retrieval and possible response by a recipient). It may be difficult for users to set up synchronous conversations, because a synchronous conversation generally requires that all conversation participants are interacting with their communications devices at the same time. In some cases, the time window for joining a conversation may be relatively short, because a sender does not generally wish to wait for a prolonged period of time before determining that a recipient is not answering their call. In the case of a missed call a sender may be able to leave a message for a recipient to be retrieved later. However, in many cases the sender will not opt to leave a message, or the recipient may not respond to the message.

BRIEF DESCRIPTION OF THE DRAWINGS

FIG. 3 is a flowchart depicting exemplary server-side video note logic;

FIG. 4 is a flowchart depicting exemplary sender client-side video note logic;

FIG. 5 is a flowchart depicting exemplary recipient client-side video note logic;

FIG. 8A is a block diagram providing an overview of a system including an exemplary centralized communications service;

FIG. 8B is a block diagram providing an overview of a system including an exemplary distributed communications service;

DETAILED DESCRIPTION

Figure 1A:
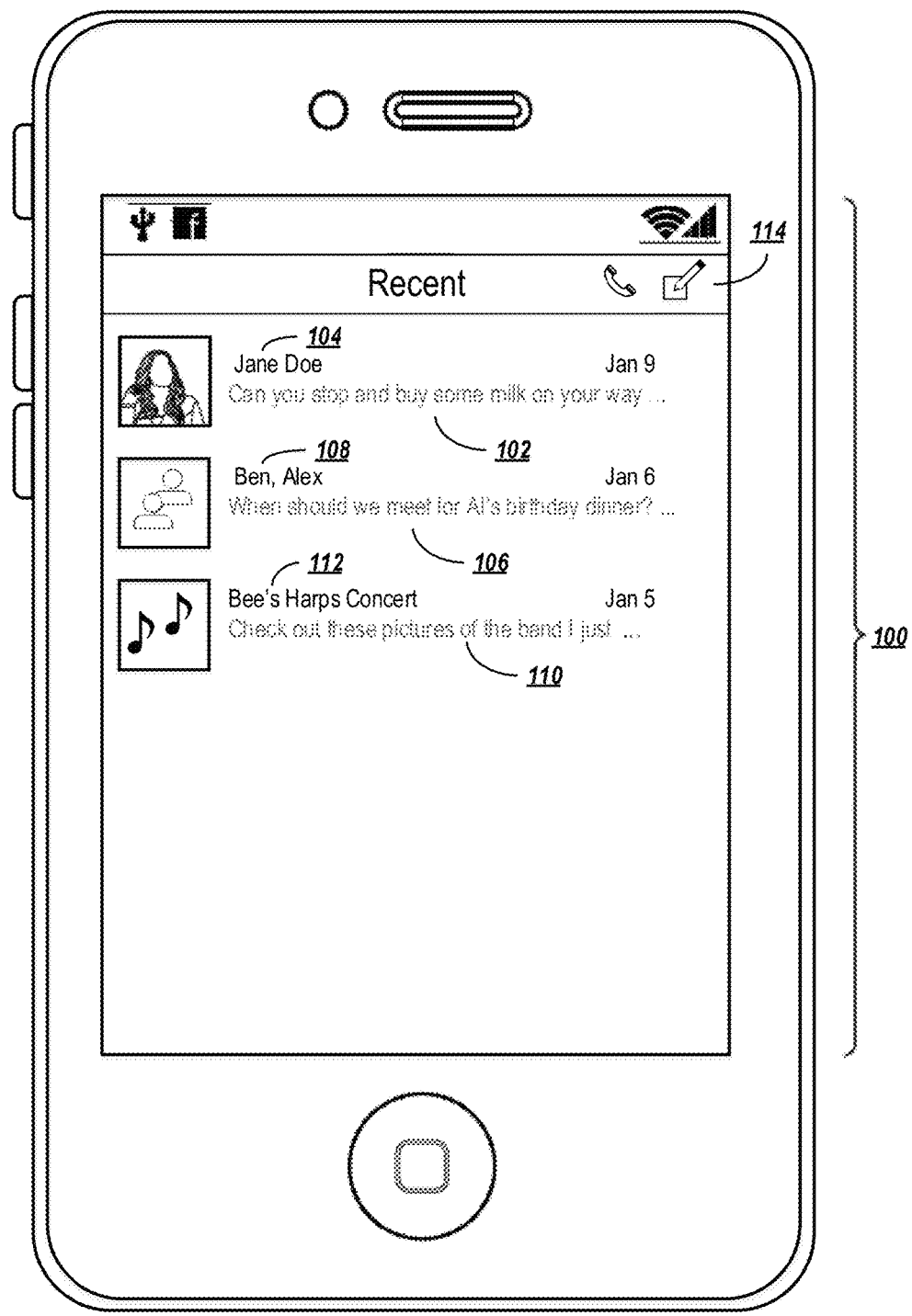
FIG. 1A depicts an exemplary communications interface including several types of individual and group messages.

Exemplary embodiments relate to techniques for sharing live video while maintaining an asynchronous copy of the video. According to some embodiments, a user begins to record video and shares the video with selected other users. If one of the other users opts to join the original user, the shared video upgrades to a live video conversation. If no one (or only some participants) joins the original user, the recorded video becomes an asynchronous artifact in the non-responsive users' messaging history.

In some embodiments, the live video may be recorded and shared in response to a first user initiating a video call with at least a second user, but receiving no answer. The first user begins to share a live video (which may become an asynchronous artifact). If the second user joins the call while the video is being recorded, the conversation may upgraded to a video conversation.

Because exemplary embodiments provide a straightforward and efficient way to convert an asynchronous conversation into a synchronous conversation, embodiments may increase the chances that users will connect in a synchronous manner. The extended period of time in which the sender is recording the initial video may provide an increased window in which the recipient can accept an invitation to join a live video conversation. At the same time, the sender is not simply waiting for the recipient to respond; the sender is able to record a video message while holding the answering window open. If the recipient does not respond, the video artifact may reinforce that the original sender intended to share an experience or conversation with the recipient, which may increase the chance that the intended recipient will reply to the video artifact.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

A general overview of video communication techniques is now described.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
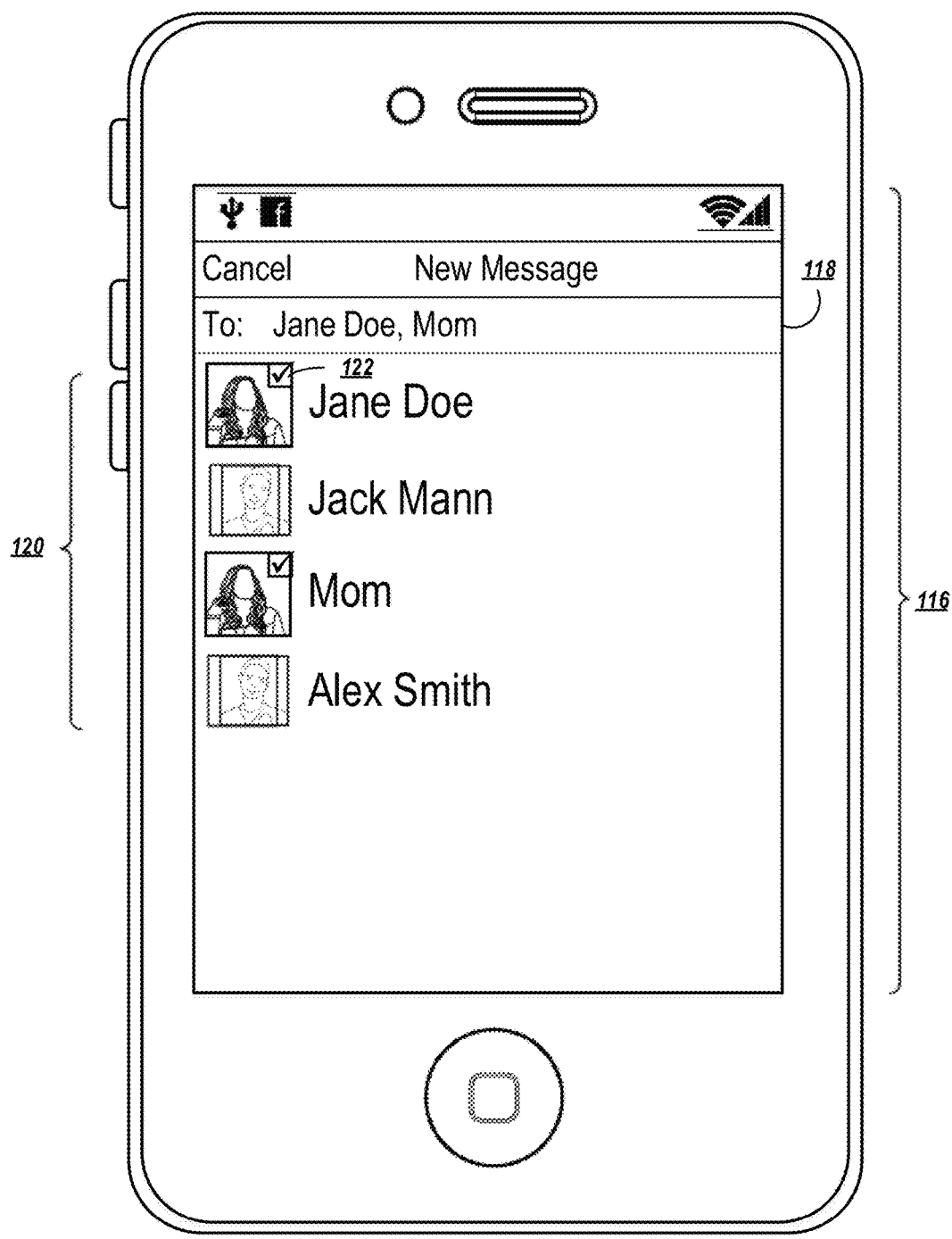
FIG. 1B depicts an example of selecting a group of recipients of a message in a messaging interface.

For example, FIG. 1B depicts an interface 116 displayed by the messaging client application in response to receiving a selection of the "compose" interface element 114. A "new message" window is displayed in the interface 116. The new message window includes a recipient field 118 for allowing the user to manually enter identifiers for one or more recipients. If available, the user's contacts list 120 may also be displayed in the interface 116 in order to simplify the selection of the recipients.

In the example of FIG. 1B, the user has entered the identifier of a recipient in the recipient field 118. In order to indicate the recipient's inclusion in the recipients list, a selection indication 122 is displayed on the recipient's icon in the contacts list 120. As shown in this example, it is possible to select more than recipient in the interface 116 in order to create a group message, e.g. by manually adding multiple recipients in the recipient field 118, selecting multiple contacts in the contacts list 120, or a combination of methods.

Figure 1C:
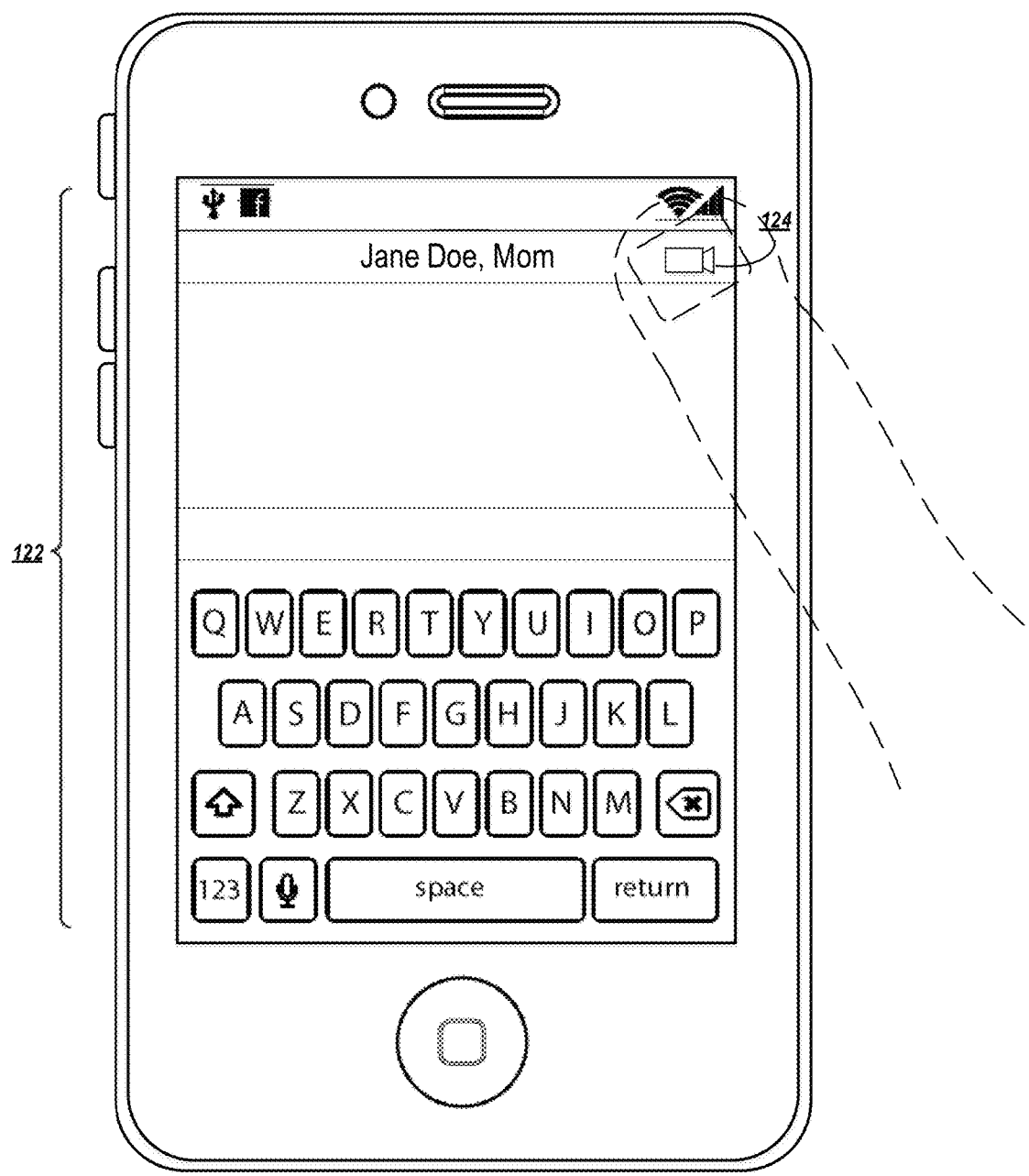
FIG. 1C depicts an exemplary interface for initiating a video communication.

As shown in FIG. 1C, a user may indicate an intent to record a video for transmission to the recipients, and/or to engage in a live (synchronous) video conversation with the recipients. The user may select the intended recipients of the video recording or video conversation before or after indicating the intent. In order to indicate the intent, a content creation interface 122 may be presented, which may include various ways to generate a message (e.g., a keyboard for entering text, an icon for recording audio, etc.). The content creation interface 122 may include an icon 124 or other designator that, upon selection, signals the user's intent to transmit video content.

Figure 1D:
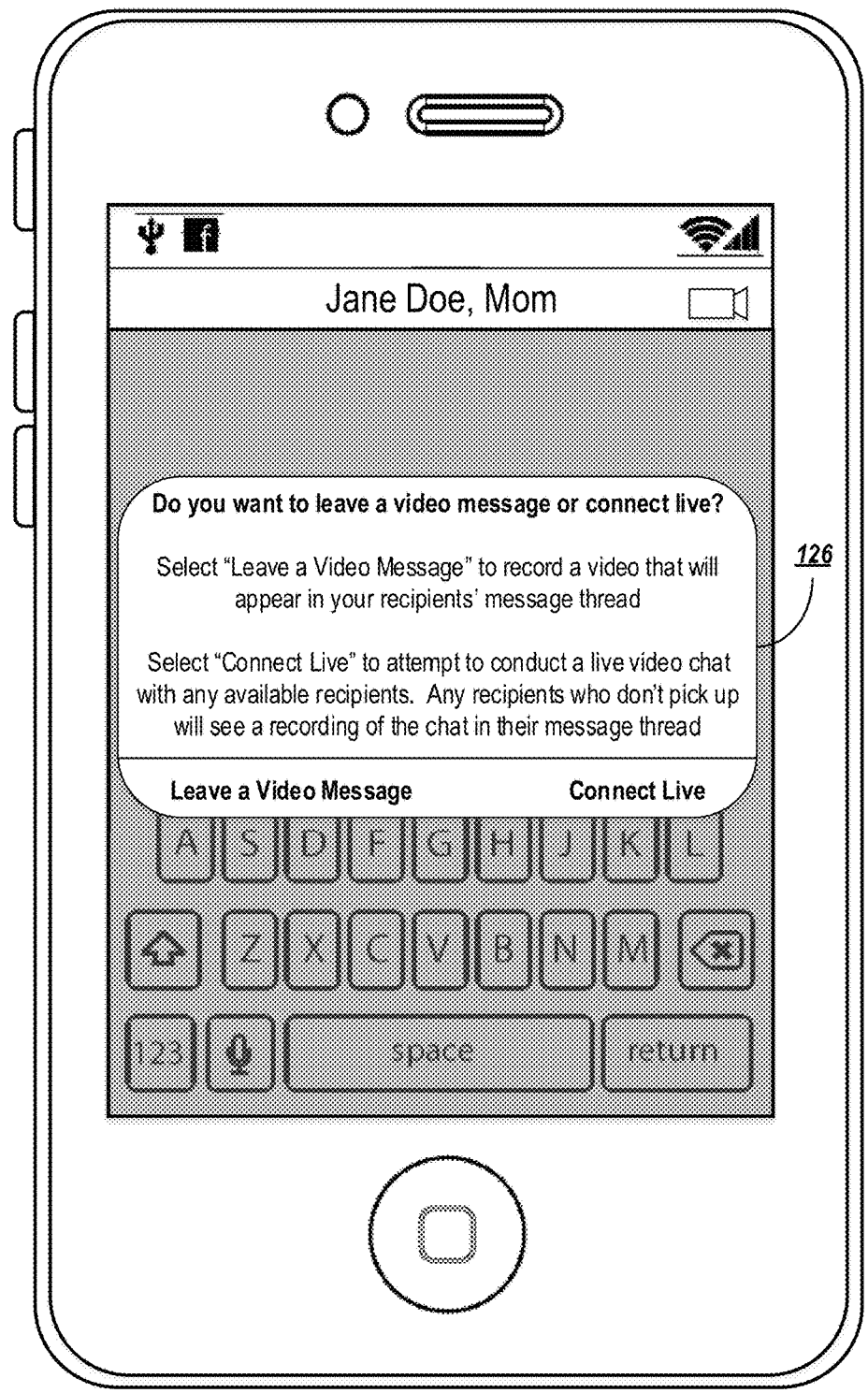
FIG. 1D depicts an exemplary interface for choosing between a live video call and an asynchronous video message.

Upon receiving a selection of the icon 124, the interface may display a prompt 126 (FIG. 1D) asking the user whether the user intends to record video for transmission as an asynchronous message, or to engage with the recipients in a live video conversation. The prompt 126 may include one or more selectable options for identifying the user's intent.

Figure 1E:
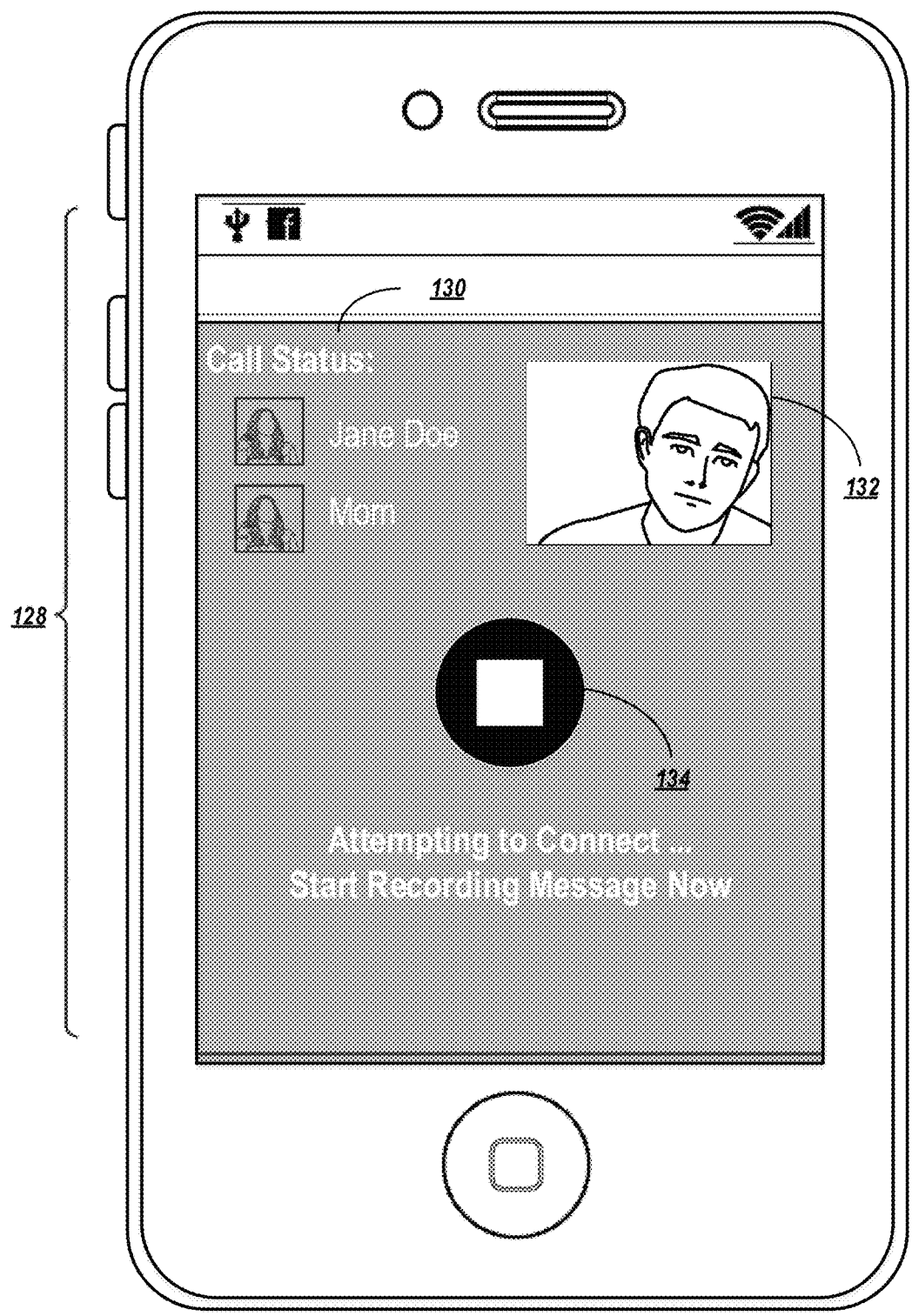
FIG. 1E depicts an exemplary interface for recording a video.

If the user opts to engage in a live video transmission, an invitation may be sent to the identified recipients to engage in real-time communication. As shown in FIG. 1E, while awaiting a response to the invitation, an interface 128 may be presented to allow the user to begin to record a message that will be displayed asynchronously for any recipients that do not respond to the invitation (or that deny the request to engage in real-time communication).

The interface 128 may include status indications 130 indicating which, if any, recipients have joined the call. In the example depicted in FIG. 1E, no users have yet joined the call and hence the status indications 130 are greyed-out. The interface 128 may further include a window 132 that shows a preview of the video message as it is being recorded.

The interface 128 may also include a video cessation element 134. Upon selecting the video cessation element 134, the system may stop recording the video, rescind the invitation to join in a real-time communication, and transmit the recorded video to the recipients to appear as an asynchronous artifact in the recipients' messaging history.

If, on the other hand, the user selects the option to record an asynchronous message on the prompt 126, a similar interface 128 may be presented. The interface 128 in this case may lack the status indications 130, since the recipients have not been invited to join in a real-time communication.

Figure 1F:
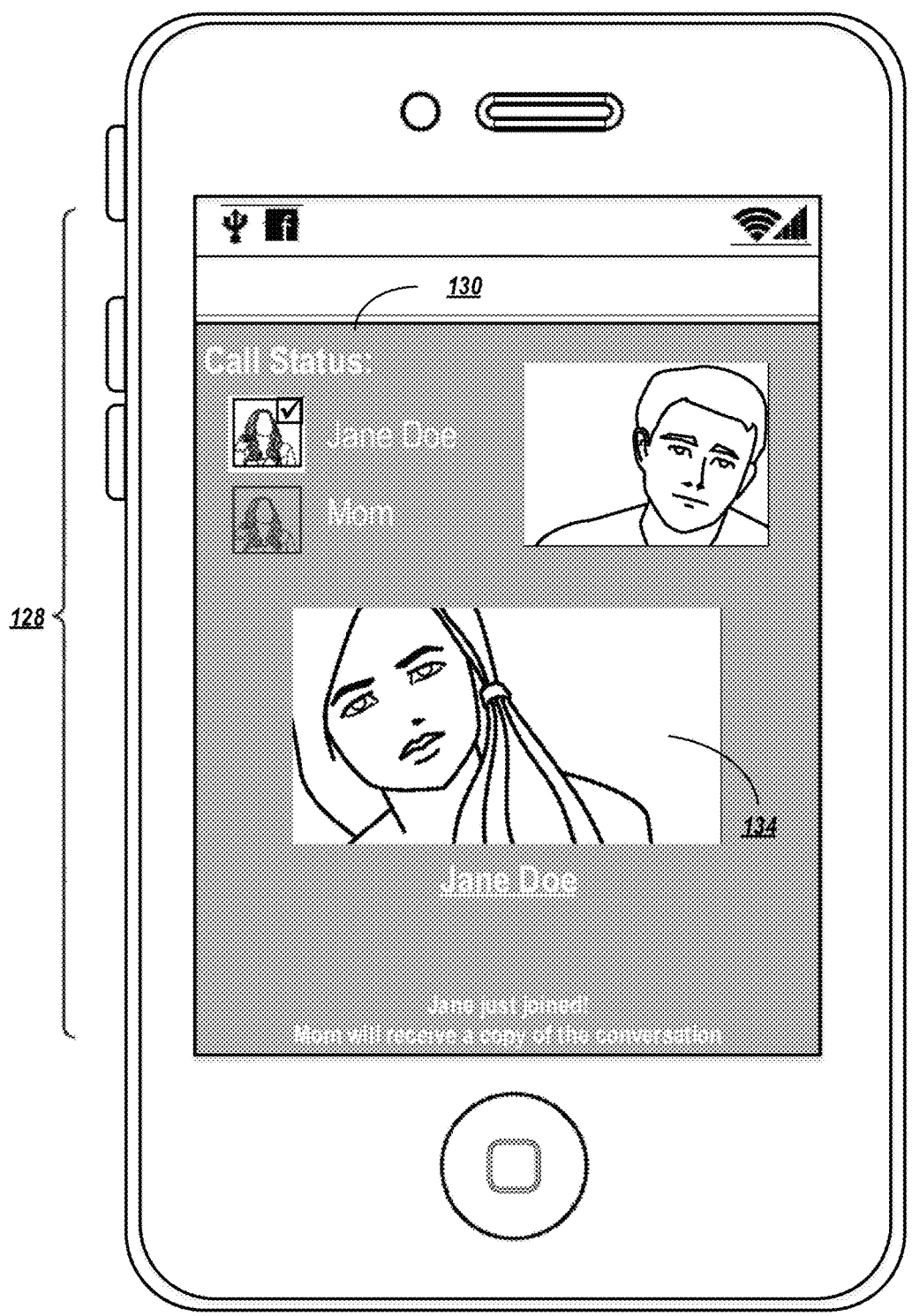
FIG. 1F depicts an exemplary interface for participating in a synchronous video conversation.

If one or more of the recipients joins the real-time communication, the interface 128 may be updated as shown in FIG. 1F. The status indications 130 may change in order to reflect which recipient(s) have joined the call. One or more display windows 134 may appear (e.g., one for each recipient that has joined the call), and the real-time communication may commence.

In some embodiments, recording of the asynchronous video artifact may cease when at least one recipient joins the call. Optionally, some or all of the video that was recorded may be sent to recipients who have not joined the call, or who do not join the call by the time the call is terminated, as an asynchronous artifact in the non-joining members messaging history. Alternatively or in addition, some or all of the real-time video call may be recorded and stored, and transmitted to the non-participating recipients as an asynchronous artifact.

Figure 2A:
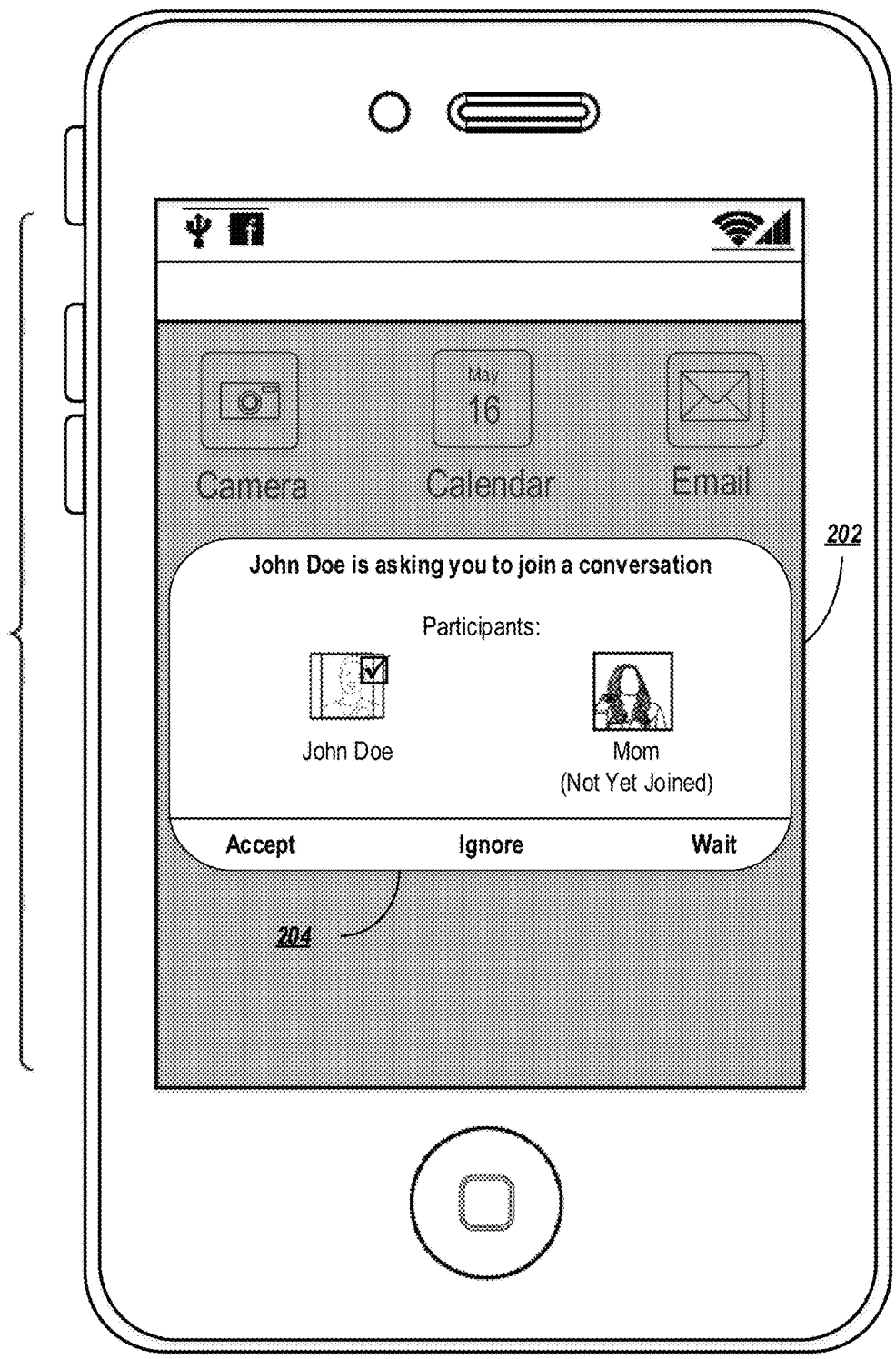
FIG. 2A depicts an exemplary interface for accepting or rejecting an invitation to a synchronous video conversation.
Figure 2B:
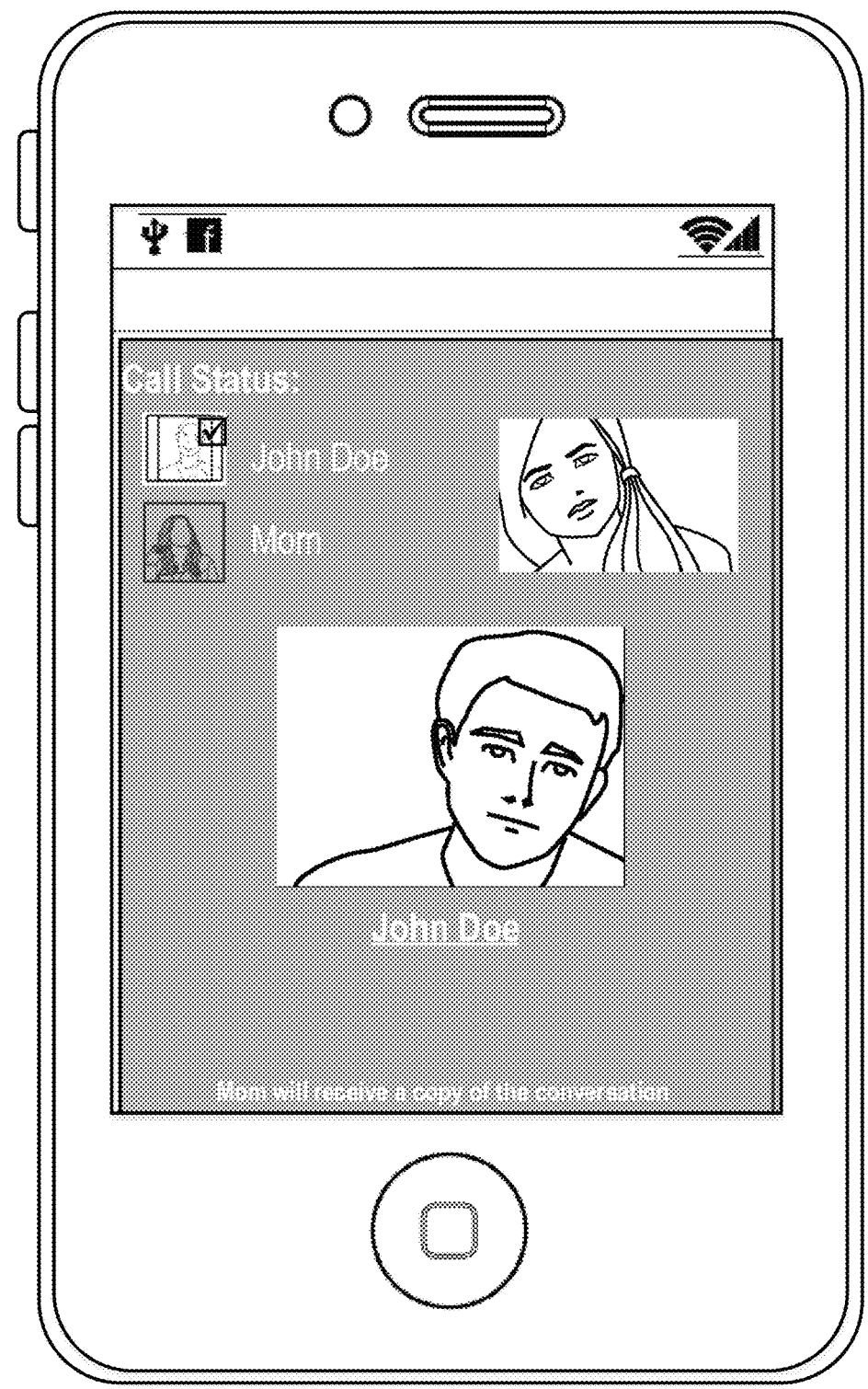
FIG. 2B depicts an exemplary interface for participating in the synchronous video conversation of FIG. 1F from the perspective of a recipient.
Figure 2C:
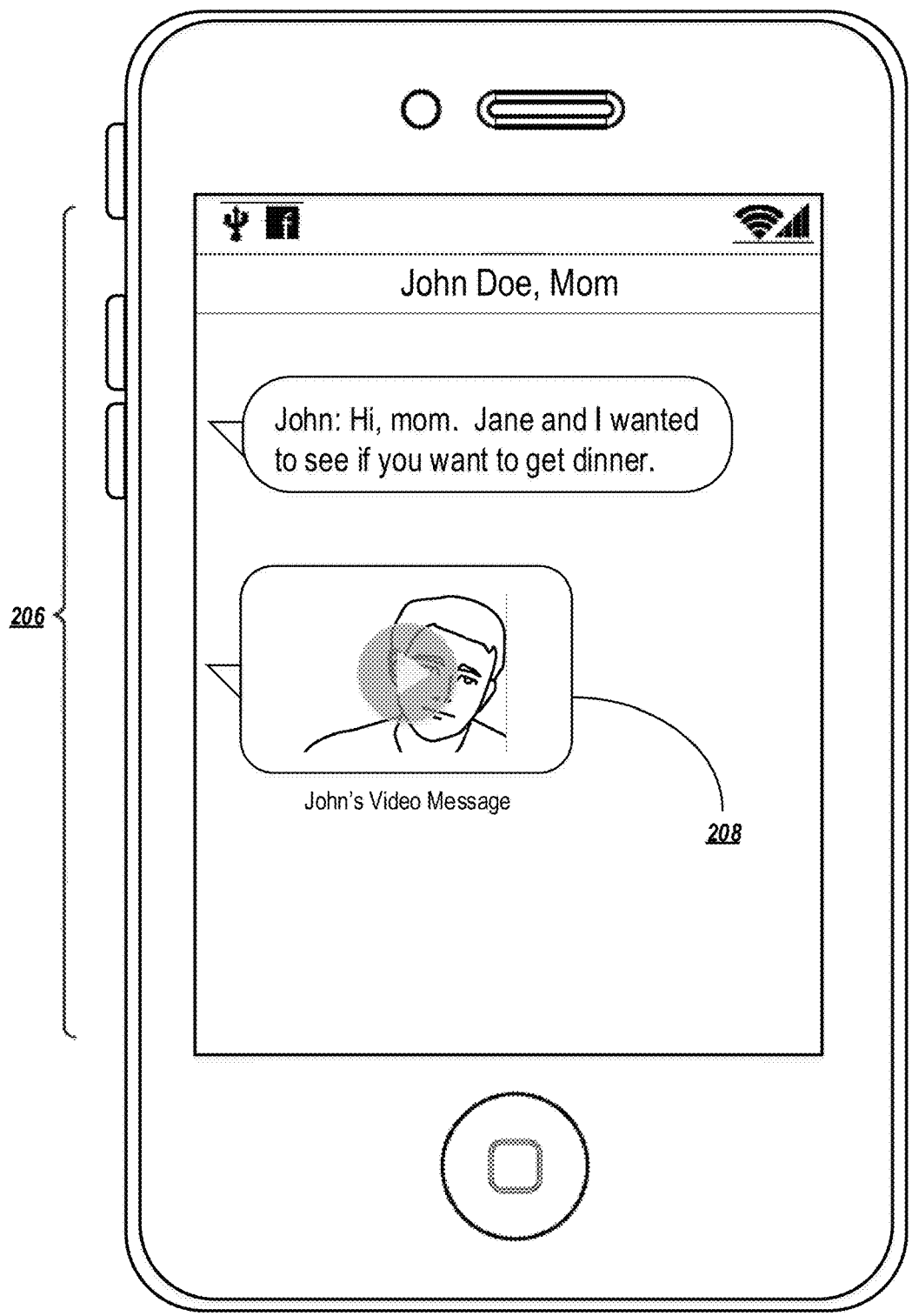
FIG. 2C depicts an exemplary messaging interface for displaying an asynchronous video message.

FIGS. 2A-2C depict the above procedure from the point of view of the recipient's communications device. Upon receiving the invitation to participate in the real-time conversation, a prompt 202 may be displayed on the recipient's communications device, as shown in FIG. 2A. The prompt 202 may identify the participants invited into the real-time communication, the organizer of the real-time conversation, and may provide a list of options 204 for responding to the invitation.

The list of options 204 may include an option to accept the invitation. Upon accepting the invitation, the interface may change to display a synchronous video communications interface (FIG. 2B). The synchronous video communications interface may be similar to the interface displayed on the original sender's device (with the exception that the preview window may display the current user, and the display windows may reflect the other participants).

The list of options 204 may further include an option to wait or defer the invitation. Because the invitation is held open as long as the original sender is recording the message, the invited recipient may have a time window in which to accept the invitation. By selecting defer, the invitation may be minimized (for example) to allow the recipient to continue in whatever tasks they might be participating. As long as the invitation window remains open, the recipient can return to the prompt 202 and accept at any time.

The list of options 204 may further include an option to expressly reject the invitation. Upon selecting the option to reject the invitation, the communications system may be informed of the rejection. Optionally, the interface 124 of the sender may be updated to reflect that the recipient has rejected the invitation. The invitation may also be implicitly rejected if the recipient's communication device and/or messaging account is offline, or if the recipient fails to respond to the prompt 202 (e.g., within a predetermined period of time, or before the invitation is rescinded because the sender completes recording of the video).

If the invitation is expressly or implicitly rejected, the recorded video may appear as an asynchronous artifact 208 in the recipient's messaging interface 206, as shown in FIG. 2C. A messaging thread may be associated with the video, which includes the recipients identified in the original invitation. Within the messaging thread, the artifact 208 may appear as a message. A play button may allow the recipient to view the video artifact 208 within the context of the thread.

In summary, the sender is able to create an asynchronous video message, which may be upgraded to a synchronous video conversation if one or more recipients accept the invitation to join the sender. If no recipients or only some recipients accept the invitation, a video artifact may be left as an asynchronous message to the non-participating recipients. Because the invitation is held open during the time that the video artifact is recorded, there is an increased chance that the participants will be able to connect in real-time communication. And because the video is stored as an artifact in the recipients' messaging history, there is an increased chance that the non-participating recipients will respond to the video artifact and engage in further conversation.

This brief summary is intended to serve as a non-limiting introduction to the concepts discussed in more detail below, in connection with FIGS. 3-8C. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous and/or asynchronous video conversation in a messaging system is next provided Asynchronous Video Notes and Synchronous Video Communications Any or all of the above-described interfaces may be presented as part of a set of procedures for engaging in asynchronous and/or synchronous video communications. FIG. 3 is a flowchart depicting an exemplary process 300 for engaging in such communications from the perspective of a communications server device.

At block 302, the server device may receive an invitation to participate in a synchronous video conversation. The invitation may originate with a sender client device and may be directed to one or more identified recipients. The invitation may include details used to set up a video conversation, such as any details necessary to connect the sender's client device to the recipients' client devices. For example, the invitation may include information pertaining to the sender's half of a handshake procedure used to set up the video conversation. The server device may process the invitation and, at block 304, may transmit the invitation to the identified recipients.

At block 306, the server device may optionally receive streaming video from the sender client device. The streaming video may correspond to a video message currently being recorded at the sender client device. The server device may transmit the streaming video to the one or more recipients identified in the invitation.

At block 308, the server device may receive an instruction. The instruction may originate at the sender client device or may originate at one of the recipients' client devices. The server device may parse the instruction in order to determine a type of the instruction. For example, a header of the instruction may identify the type of the instruction, while the content or payload of the instruction may include details used by the server device to carry out the instruction.

At block 310, the server device may determine if the type of the instruction corresponds to a video conversation handshake. For example, a recipient may have accepted the invitation transmitted at block 304.

If the determination at block 310 is "YES" (i.e., the instruction is a video conversation handshake), then processing may proceed to block 312. At block 312, the server device may use the information in the original invitation and/or the instruction in order to set up a video conversation between the sender and the recipient that has replied. The instruction received at block 308 may include, for example, information pertaining to the recipient's half of a video conversation handshake procedure. If a synchronous video conversation associated with the invitation has not yet been established, then a new video conversation may be established with the sender and the recipient whose instruction was received in block 308. If the invitation identified multiple recipients and the sender has already entered into a video conversation with another recipient, then at block 312 the recipient associated with the instruction received at block 308 may be added to the existing video conversation. Processing may then return to block 308 and the server device may await further instructions.

If the determination at block 310 is "NO" (i.e., the instruction is not a video conversation handshake), then processing may proceed to block 314. At block 314, the server device may determine if the instruction is a thread creation instruction. For example, the sender's client device may request that a new messaging thread be created to hold the asynchronous video artifact generated at the client device.

If the determination at block 314 is "YES" (i.e., the instruction is an instruction to create a new message thread), then processing may proceed to block 316. At block 316, a new messaging thread may be created. The thread creation instruction may specify the participants in the thread, or may refer to the earlier invitation and the sender and any recipients designated by the invitation may be treated as the participants. A thread identifier may be assigned to the thread and the thread identifier may be returned to the client device that originated the instruction received at block 308. Processing may then return to block 308 and the server device may await further instructions.

If the determination at block 314 is "NO" (i.e., the instruction is not an instruction to create a new message thread), then processing may proceed to block 318. At block 318, the server device determines if the instruction is an instruction to transmit a message to one or more recipients. For example, the sender's client device may complete recording of the video and may request that a message be transmitted to the recipients identified in the invitation, where the message includes a copy of the video. If the determination at block 318 is "YES" (i.e., the instruction is a message), then processing may proceed to block 320, where the message may be transmitted to any recipients identified in the instruction (and/or recipients identified in an invitation referenced by the instruction). Processing may then return to block 308 and the server device may await further instructions.

If the determination at block 318 is "NO" (i.e., the instruction is not a message), then processing may proceed to block 322. At block 322, the server device may perform any other processing appropriate to the type of instruction received at block 308. Processing may then return to block 308 and the server device may await further instructions.

FIG. 4 is a flowchart depicting an exemplary process 400 for engaging in asynchronous and/or synchronous communications, from the perspective of a client device associated with a sender or originator of the communication.

At block 402, the client device may receive an identification of recipients for an asynchronous and/or synchronous communication. For example, an interface may be presented that includes a list of contacts associated with the sender in a messaging service. Optionally, a list of recipients may be suggested to the sender. The interface may allow for some or all of the contacts or suggested recipients to be selected.

At block 404, the client device may receive an identification of intent. For example, the client device may receive an instruction to record a video message (as in FIG. 1C) and may present a prompt, such as the one depicted in FIG. 1D, to determine if the user intends to transmit an asynchronous video message or participate in a synchronous video conversation.

Assuming that the intent is to participate in a synchronous video conversation, at block 406 the client device may transmit an invitation to participate in the synchronous video conversation to the recipients identified at block 402. The invitation may be transmitted to a server device associated with a messaging service.

At block 408, the client device may receive an instruction to initiate recording of a video. In some embodiments, recording of the video may begin automatically as soon as the invitation is sent. In other embodiments, recording of the video may be manually triggered while the sender awaits a response to the invitation.

In the example depicted in FIG. 4, the user first identifies recipients of the video and then begins to record the video. It is noted, however, that this process may be reversed. For example, the user may first begin recording the video, and may then identify recipients for the video while the video is being recorded or after recording of the video is complete.

At block 410, the client device may optionally stream the video whose recording was initiated at block 410. The video may be streamed through a server device to the recipients identified in the invitation.

At block 412, the client device may determine if the invitation has been accepted by at least one of the recipients. For example, the client device may receive an acceptance of the invitation or a rejection of the invitation from the server device.

If the determination at block 412 is "NO" (i.e., the invitation has not yet been accepted), processing may proceed to block 414. At block 414, the client device may determine if recording of the video has been stopped. Recording of the video may be stopped manually, for example when the user presses a stop button, or may be stopped automatically (e.g., when the user reaches a maximum video length threshold).

If the determination at block 414 is "NO" (i.e., the recording has not yet been stopped), processing may return to block 410 and the video may optionally continue to be streamed to the recipients. If streaming is not implemented, then processing may return to block 412 and the client device may determine if the invitation has been accepted. The client device may wait a predetermined amount of time (e.g., 2 seconds) before checking again to determine whether the invitation has been accepted.

If the determination at block 414 is "YES" (i.e., the recording has been stopped), then the invitation may be rescinded or canceled and processing may proceed to block 420 (described in more detail below).

Returning to block 412, if the determination is "YES" (i.e., the invitation has been accepted), processing may proceed to block 416. At block 416, the client device may transition the current video recording to a video conversation. The server device may facilitate a synchronous video connection between the sender and any recipients that have joined the video call. An interface for recording the video, such as the interface depicted in FIG. 1E, may be altered or replaced to present the user with an interface for participating in a synchronous conversation (such as the interface depicted in FIG. 1F).

Optionally (block 418), the client device may continue to record the video to be stored as an asynchronous record in a messaging thread associated with the invitation. Alternatively, recording of the video may be stopped. The initially-recorded video, the recorded video plus the video conversation, or just the video conversation may be stored as asynchronous artifacts in the messaging thread.

Once the recording has stopped at block 414 and/or when the video conversation has been completed, processing may proceed to block 420 and the client device may add the recorded video note to a messaging thread associated with the sender and the recipients identified at block 402. If a messaging thread including these participants already exists, the client device may retrieve a thread identifier associated with the thread. If no such thread exists, the client device may request that the server device create one.

At block 422, the client device may transmit the recorded video as part of a message associated with the thread identifier from block 420. At block 424, the client device may receive a response to the video in the messaging thread identified or created at block 420. The response may be added to the messaging thread and displayed on the client device.

FIG. 5 is a flowchart depicting an exemplary process 500 for engaging in asynchronous and/or synchronous communications, from the perspective of a client device associated with a recipient or invitee of the communication.

At block 502, the client device may receive an invitation to participate in a synchronous video conversation. For example, the server device may transmit the above-described invitation on behalf of the original sender.

At block 504, the client device may display a prompt asking the user whether the user wishes to join the synchronous video conversation (e.g., the prompt depicted in FIG. 2A). The prompt may provide a list of options, such as an option to accept and join the synchronous video conversation, an option to reject the invitation, and an option to defer action on the invitation.

Optionally, at block 506 the client device may receive streaming video from the sender and may display the streaming video.

At block 508, the client device may determine whether an instruction has been received (e.g., an instruction issued through an input device such as a keyboard, mouse, or touchscreen display of the client device). If the determination at block 508 is "NO" (i.e., an instruction has not been received), then processing may proceed to block 510. At block 510, the client device determines if the invitation has been rescinded. The invitation may be rescinded, for example, when the sender completes recording of the video and an asynchronous video note is added to the recipients' messaging histories. Alternatively, the sender may cancel transmission of the message and the video note may be deleted at the sender's device.

If the determination at block 510 is "NO" (i.e., the invitation has not been rescinded), then processing may return to block 504, and the prompt may continue to be displayed and the video may optionally continue to be streamed. Processing may wait a predetermined period of time (e.g., two seconds) before returning to block 504.

If the determination at block 510 is "YES" (i.e., the invitation has been rescinded), then processing may proceed to block 512. At block 512, a video note recorded by the sender may be received (e.g., from the server device). The video note may be received as part of a message transmitted by the original sender. The video note may be added, as an asynchronous artifact, to the message history of the recipient in a thread associated with the sender, the recipient, and any other participants identified in the original invitation. The thread may be identified by a thread identifier received as part of the message. When viewing a messaging interface, such as the interface depicted in FIG. 2C, the video note may appear in the messaging history.

Processing may then proceed to block 518. At block 518, the recipient may generate a message in response to the video note and may transmit the message to the server device. The message may be associated with the same message thread identifier as the video note received at block 512.

Returning to block 508, if the determination is "YES" (i.e., an instruction has been received), then the client device may determine what type of instruction was received. If the instruction is an instruction to reject the invitation, then processing may proceed to block 512 and the video note may be received and associated with a messaging thread in the recipient's messaging history.

If the instruction is an instruction to defer action, then processing may proceed to block 514. At block 514, the prompt may be minimized and the user may continue to interact with their client device. Processing may return to block 508 and the client device may await another action, such as a rejection or acceptance of the invitation, or the rescinding of the invitation.

If the instruction is an instruction to accept the invitation, then processing may proceed to block 516. At block 516, the client device may join a video conversation with the sender. An interface, such as the one depicted in FIG. 2B, may be presented to the user for participating in the synchronous conversation.

Figure 6:
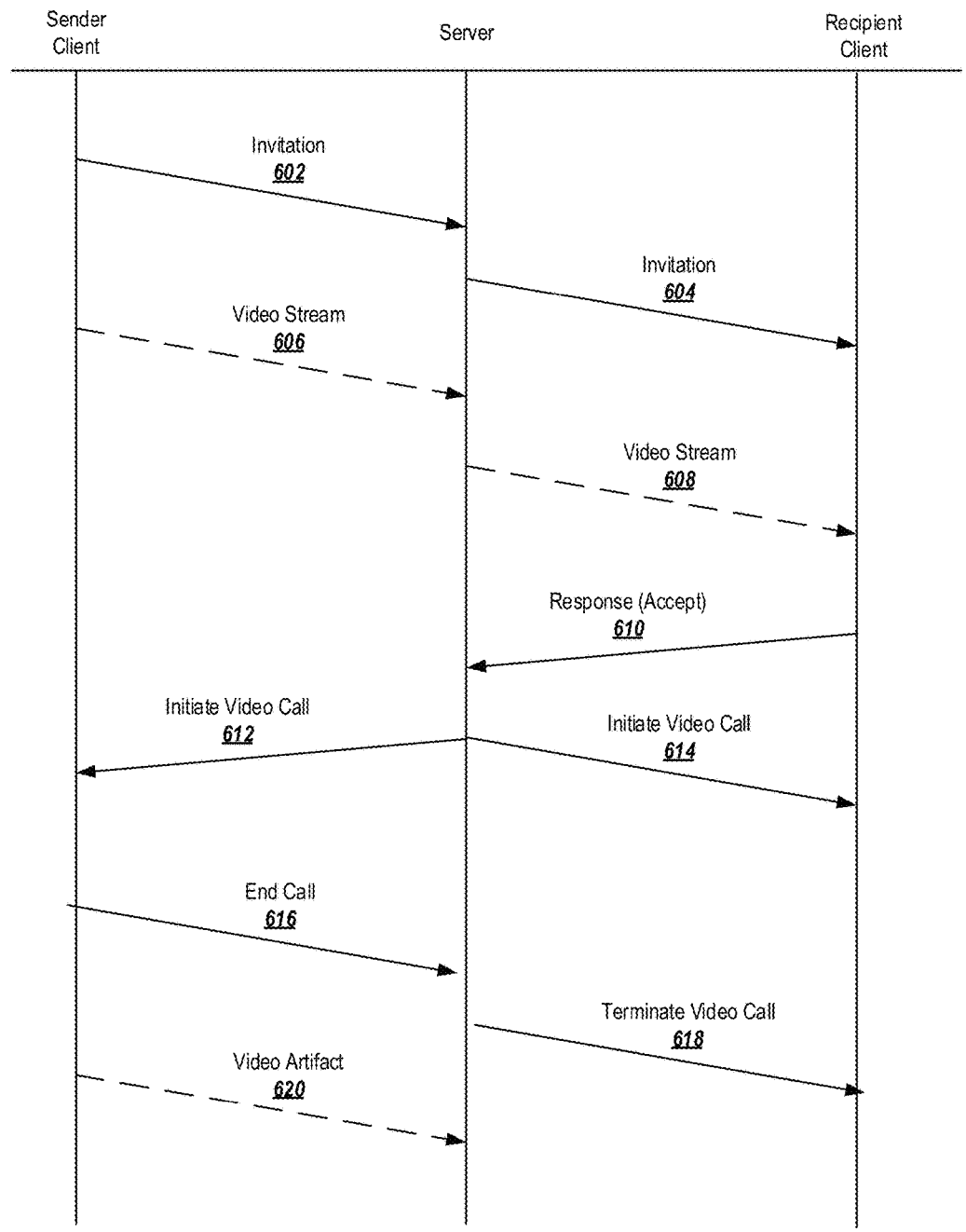
FIG. 6 is a data flow diagram depicting information exchange between various devices, according to an exemplary embodiment in which an invitation to a video call is accepted.

FIG. 6 is a data flow graph depicting exemplary exchanges of data between the above-mentioned server device, sender client device, and recipient client device.

An invitation 602 may be transmitted from a client device associated with the sender to the server device. In response to receiving the invitation, the server device may transmit a copy 604 of the invitation to each recipient client device identified in the invitation.

Optionally, the sender client may transmit a video stream 606 to the server device as the video note is recorded at the client device. The server device may relay a copy 608 of the video stream to each recipient client identified in the invitation.

The recipient client device may transmit a response 610 back to the server. The response 610 may be a response to the invitation 602 and, in this example, indicates that the recipient client device has accepted the invitation to participate in a synchronous conversation. As a result, the server device may transmit video call initiation instructions 612, 614 to the sender's client and the recipient's client. These instructions may include information allowing the clients to connect in a synchronous video call. The server device may rely on information from the invitation 602 and the response 610 (e.g., video call handshake information) in order to generate the initiation instructions 612, 614.

At some point, the sender or one of the participants may end the video call. In this example, the sender sends a call termination instruction 616 to the server, and the server accordingly sends a termination instruction 618 to the participants in the call.

Upon completion of the call, the client device may optionally transmit an asynchronous video artifact 620 to the server for distribution to participants identified in the invitation 602. The video artifact may be, for example, some or all of the video recorded by the sender before the communication was upgraded to a synchronous video call, some or all of the synchronous video call, or both. In some embodiments, each recipient receives a copy of the video artifact 620. For example, the video artifact 620 may be added to the messaging history of the recipients. In other embodiments, only those recipients that did not participate in the video call receive a copy of the video artifact. A new messaging thread (e.g. a thread between only the sender and the non-participating recipient) may be created, an existing thread may be identified, or the video artifact may be presented outside the context of a messaging thread.

In this example, the video artifact 620 is transmitted in response to the call being terminated. However, the video artifact may be transmitted at different times. For example, as soon as the asynchronous video recording is upgraded to a synchronous video call with the transmission of the video call initiations 612, 614, recording of the video may cease at the sender's client device and the video artifact may be transmitted.

In further embodiments, the initial invitation 602 may be an invitation to participate in a video call, and recording of the video note to serve as a video artifact 620 may begin after the video call fails to connect (e.g., if the response 610 has not been received within a predetermined period of time).

Figure 7:
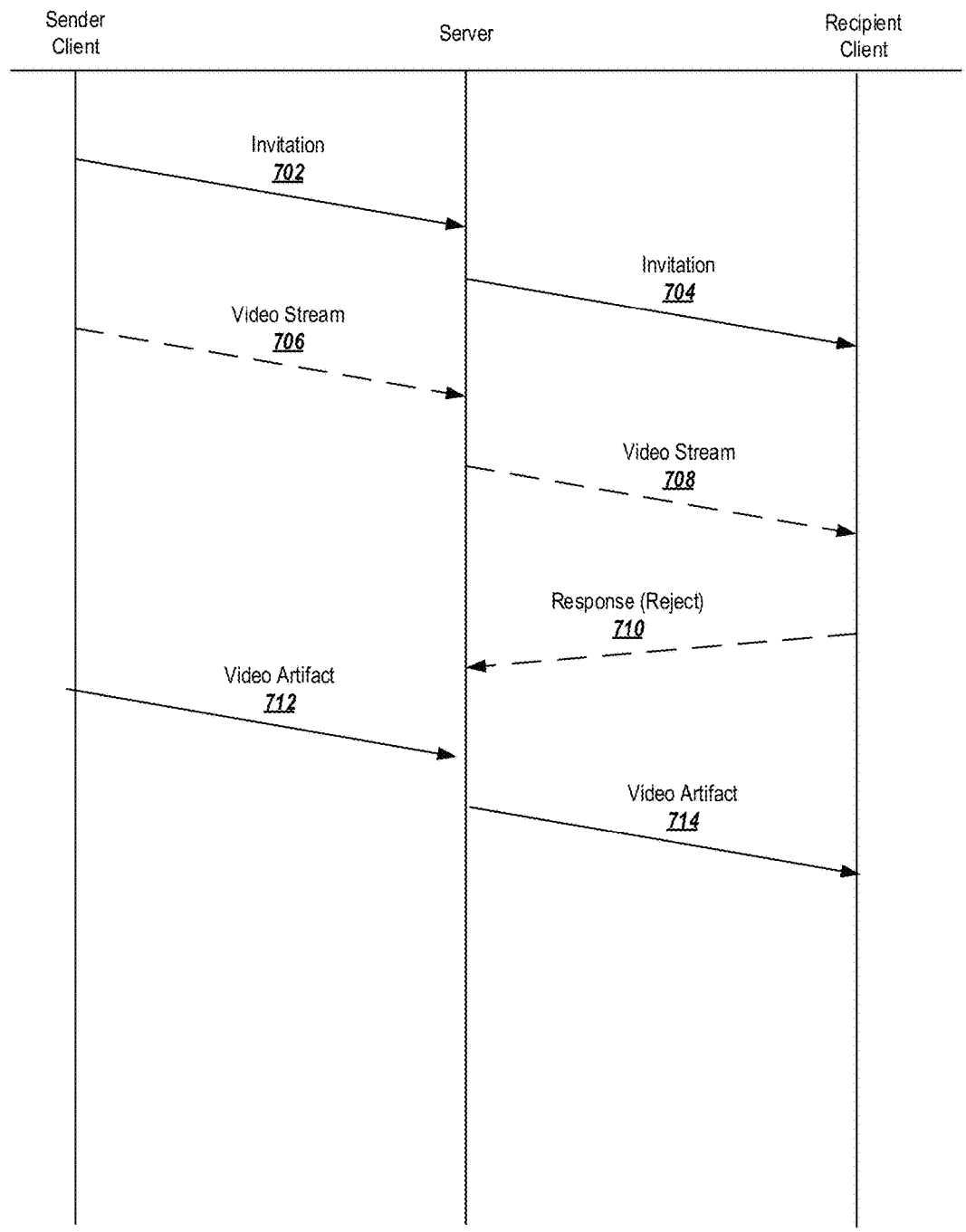
FIG. 7 is a data flow diagram depicting information exchange between various devices, according to an exemplary embodiment in which an invitation to a video call is expressly or implicitly rejected.

FIG. 7 is a data flow diagram depicting information exchange between various devices, according to an exemplary embodiment in which an invitation to a video call is expressly or implicitly rejected.

As shown in FIG. 7, the initial invitations 702, 704 and video streams 706, 708 are distributed in the same manner as in FIG. 6. However, in this case, the response 710 is a rejection of the invitation. The response 710 may be an express rejection of the invitation (e.g., the recipient selects the "reject" option on the prompt) or an implicit rejection of the invitation (e.g., the recipient fails to respond to the invitation within a predetermined period of time, or the invitation is rescinded before the recipient can respond.

The server may optionally make the sender's client device aware of the rejection. In any event, the asynchronous video artifact 712 recorded by the sender's device may be transmitted to the server, and a copy 714 may be relayed to the recipient's mobile device for inclusion in a message thread associated with the sender, recipient, and any other invitees of the invitation 702.

Messaging System Overview

Figure 8C:
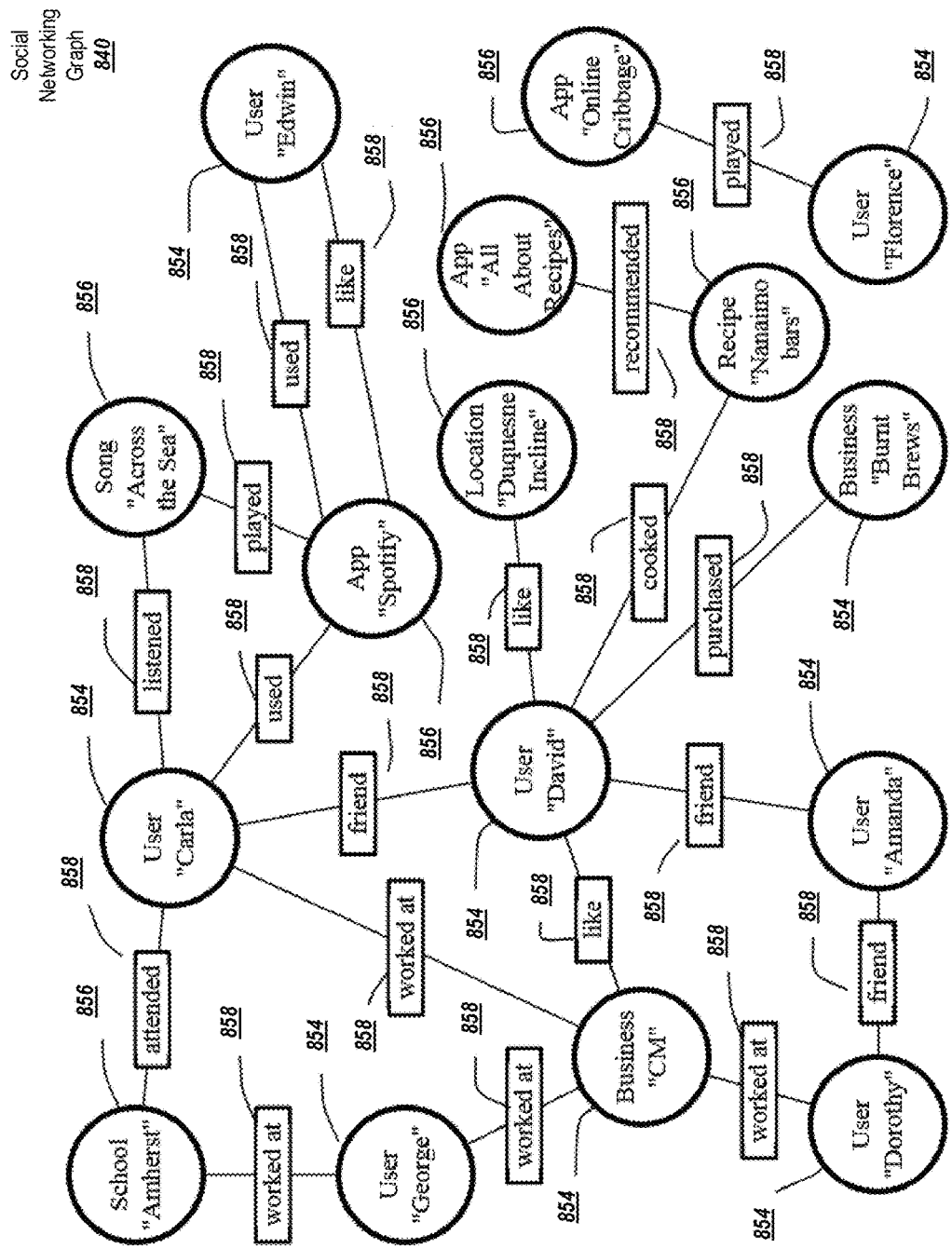
FIG. 8C depicts the social networking graph of FIGS. 8A-8B in more detail.

These examples may be implemented by a messaging system that is provided either locally, at a client device, or remotely (e.g., at a remote server). FIGS. 8A-8C depict various examples of messaging systems, and are discussed in more detail below.

FIG. 8A depicts an exemplary centralized messaging system 800, in which functionality for organizing messages asynchronously and/or using threads is integrated into a messaging server. The centralized system 800 may implement some or all of the structure and/or operations of a messaging service in a single computing entity, such as entirely within a single centralized server device 826.

The messaging system 800 may include a computer-implemented system having software applications that include one or more components. Although the messaging system 800 shown in FIG. 8A has a limited number of elements in a certain topology, the messaging system 800 may include more or fewer elements in alternate topologies.

A messaging service 800 may be generally arranged to receive, store, and deliver messages. The messaging service 800 may store messages while messaging clients 820, such as may execute on client devices 810, are offline and deliver the messages once the messaging clients are available.

A client device 810 may transmit messages addressed to a recipient user, user account, or other identifier resolving to a receiving client device 810. In exemplary embodiments, each of the client devices 810 and their respective messaging clients 820 are associated with a particular user or users of the messaging service 800. In some embodiments, the client devices 810 may be cellular devices such as smartphones and may be identified to the messaging service 800 based on a phone number associated with each of the client devices 810. In some embodiments, each messaging client may be associated with a user account registered with the messaging service 800. In general, each messaging client may be addressed through various techniques for the reception of messages. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the messaging system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio recording, such as in the case where the input device 812 is a microphone. Accordingly, the input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the messaging server 826), or may be located remotely at the messaging server 826 (in which case, the audio recording may be transmitted to the messaging server 826 and the messaging server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a messaging server 826. The messaging server 826 may be operative to receive, store, and forward messages between messaging clients.

The messaging server 826 may include a network interface 822, messaging preferences 828, and messaging inbox logic 830. The messaging preferences 828 may include one or more privacy settings for one or more users and/or message threads. For example, the messaging preferences 828 may include a setting that indicates whether to display messages synchronously or asynchronously. Furthermore, the messaging preferences 828 may include one or more settings, including default settings, for the logic described herein.

The messaging logic 830 may include video note logic 832 for processing video notes and upgrading asynchronous video conversations to synchronous conversations, as described above. The video note logic 832 may include, for example, logic similar to that described in connection with FIG. 4.

The network interface 822 of the client 810 and/or the messaging server 826 may also be used to communicate through the network 824 with a social networking server 836. The social networking server 836 may include or may interact with a social networking graph 838 that defines connections in a social network. Furthermore, the messaging server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social-networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the video note logic is incorporated into the messaging server 826. In contrast, FIG. 8B depicts an exemplary distributed messaging system 850, in which functionality for processing video notes and upgrading asynchronous conversations to synchronous conversations is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate video note server 852, which hosts the thread creation component 832 and the thread display component 834. The video note server 852 may be distinct from the messaging server 826 but may communicate with the messaging server 826, either directly or through the network 824, to provide the functionality of the video note logic 832 to the messaging server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the messaging server 826 may have limited resources (e.g. processing or memory resources) that limit or preclude the addition of the additional pivot functionality. In such situations, the capabilities described herein may still be provided through the separate pivot server 882.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
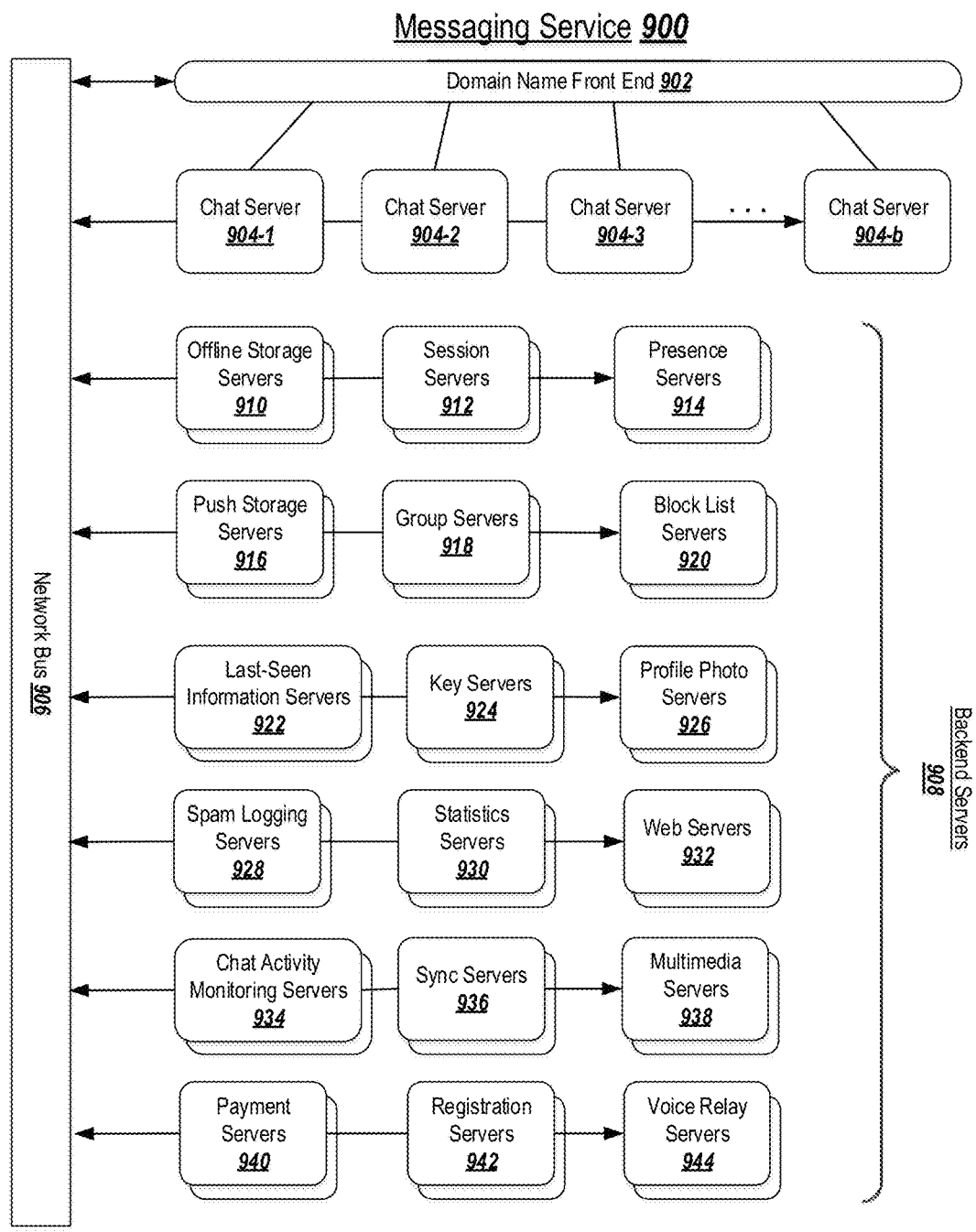
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
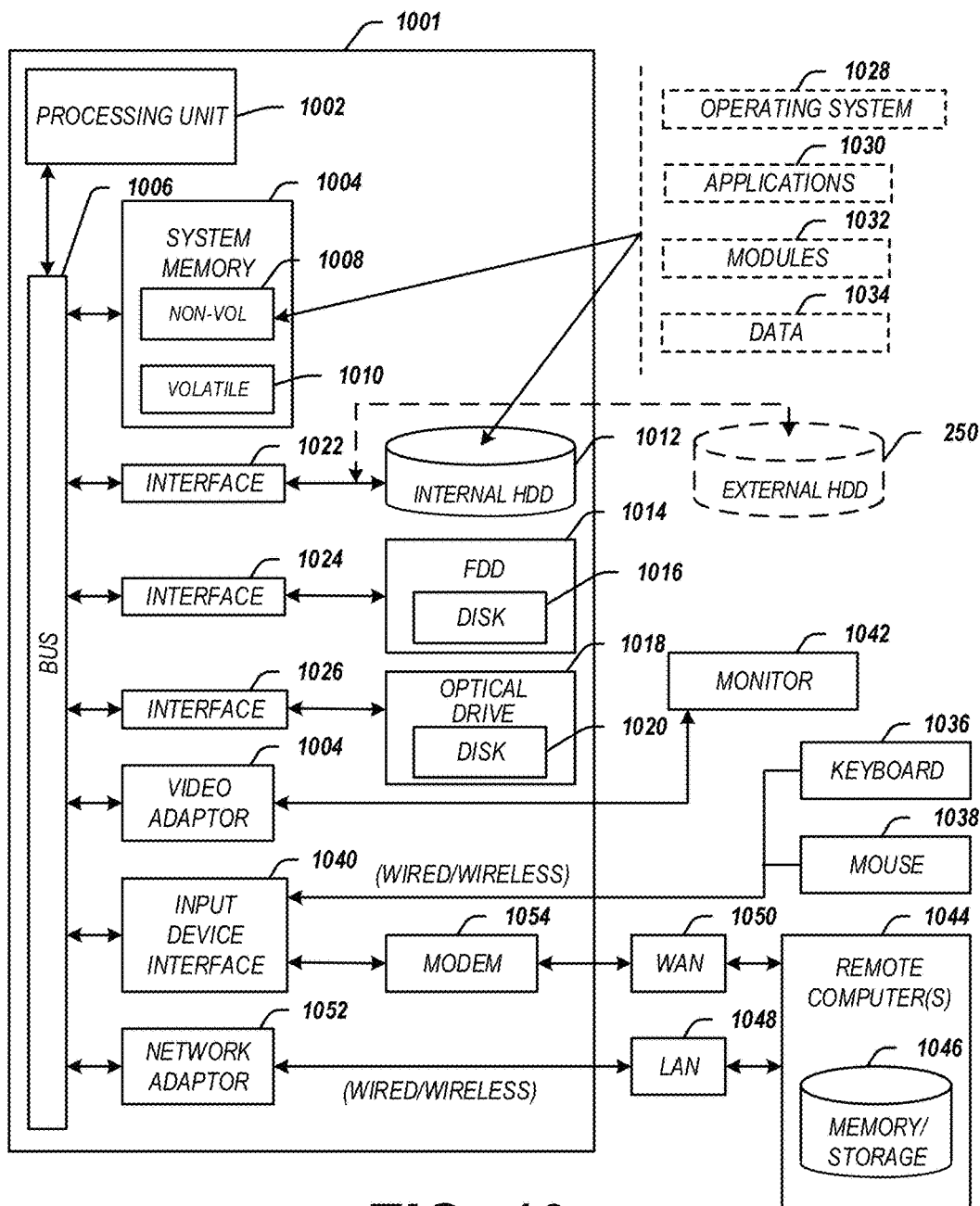
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
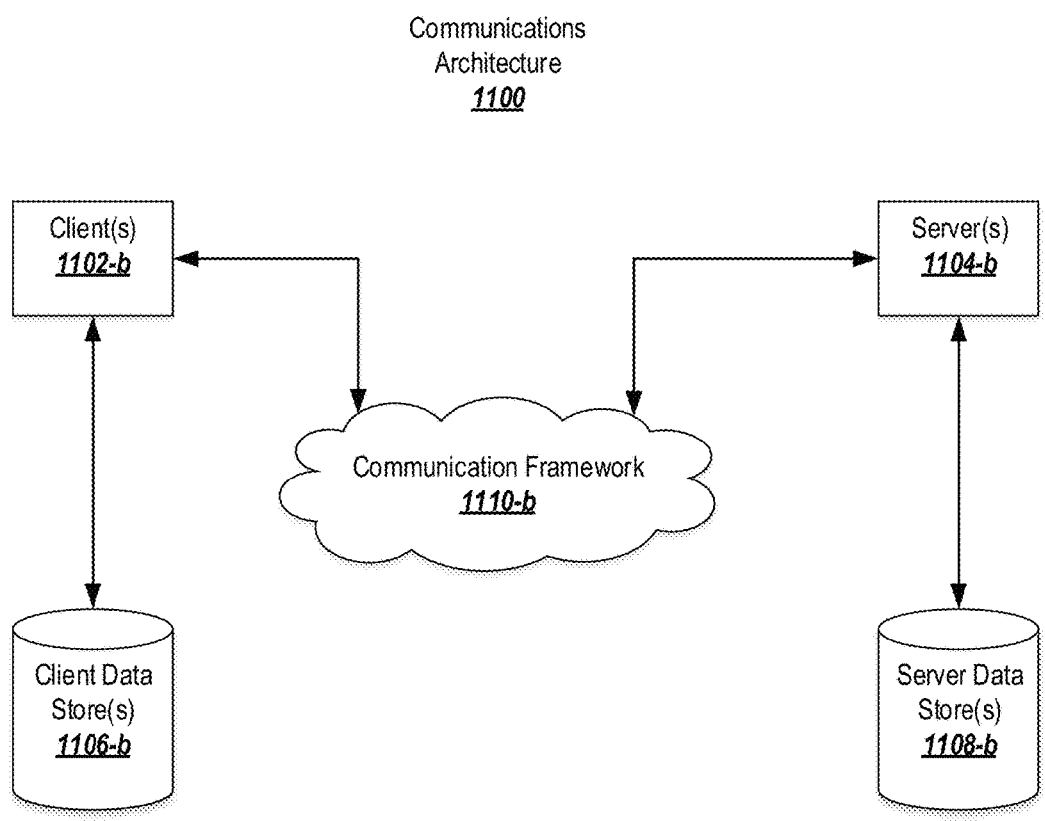
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
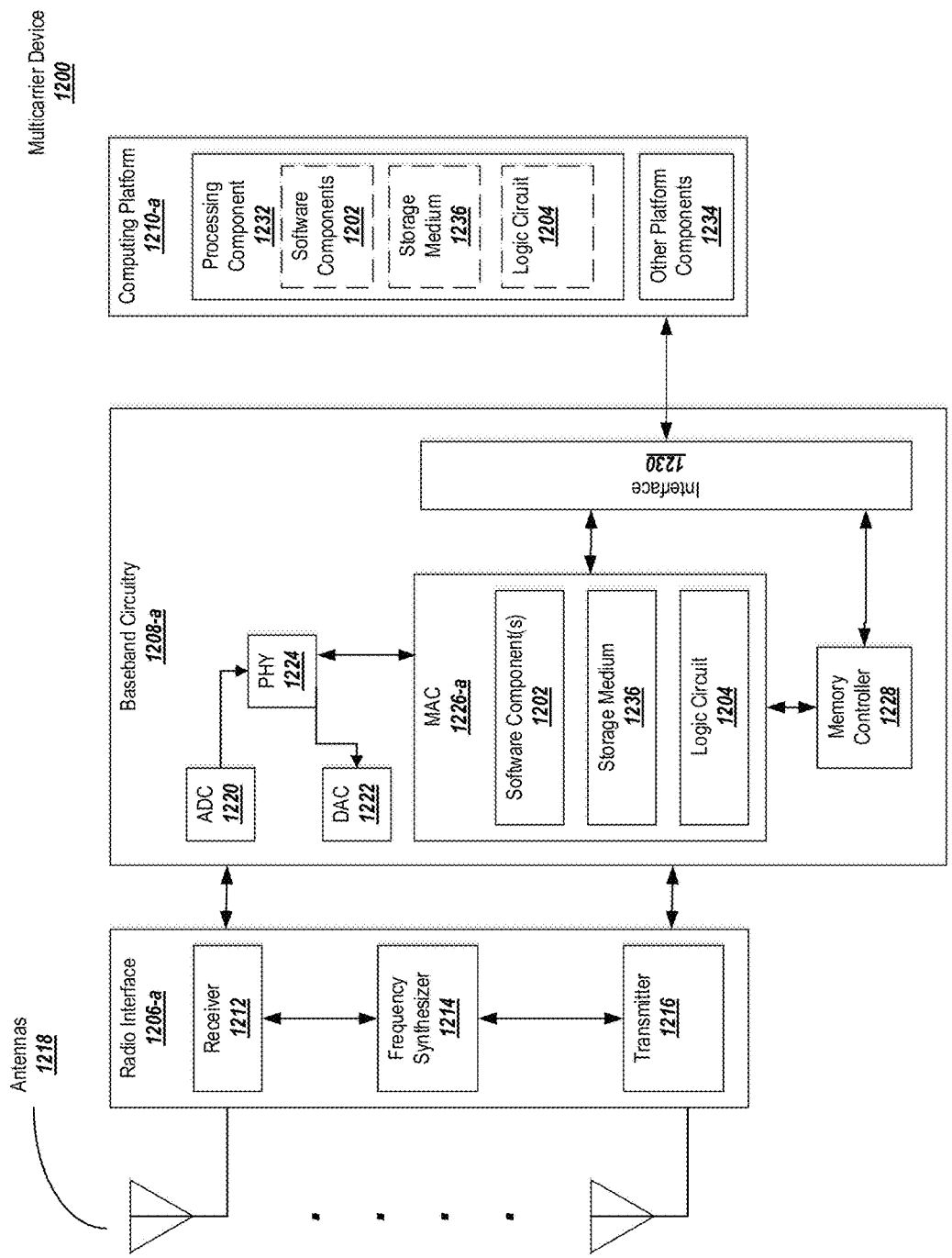
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   initiating recording of a video;
   receiving an indication of a first recipient and a second recipient for the video, the first and second recipients being members of a messaging service;
   transmitting a first invitation to the first recipient and a second invitation to the second recipient to join a live video conversation;
   indicating an intention that:
   i) the video recording become the live video conversation upon receipt of an acceptance of the first invitation, the second invitation, or both the first invitation and the second invitation, and
   ii) become an asynchronous artifact if any of the first invitation or second invitation are not accepted;
   continuing to record the video while awaiting a response to the first invitation, the second invitation, or both the first invitation and the second invitation;
   in response to receiving the acceptance of the first invitation, converting the video into the live video conversation with the first recipient and recording at least a portion of the live video conversation; and in response to not receiving the acceptance of the second invitation, using the recorded portion of the live video conversation with the first recipient as at least part of the asynchronous artifact in a message thread with the second recipient.

2. The method of claim 1, wherein recording of the video is initiated in response to failure to connect to the live video conversation.

3. The method of claim 1, further comprising streaming the video to the first recipient or the second recipient while awaiting a response to the first invitation or the second invitation.

4. The method of claim 1, wherein the first invitation or the second invitation remains open until an instruction to cease recording of the video is received.

5. The method of claim 1, further comprising receiving a response to the video in the messaging thread.

6. A non-transitory computer-readable medium storing instructions configured to cause one or more processors to:
    initiate recording of a video;
    receive an indication of a first recipient and a second recipient for the video, the first and second recipients being members of a messaging service;
    transmit a first invitation to the first recipient and a second invitation to the second recipient to join a video conversation;
    indicate an intention that:
    i) the video recording become the live video conversation upon receipt of an acceptance of the first invitation, the second invitation, or both the first invitation and the second invitation, and
    ii) become an asynchronous artifact if any of the first invitation or second invitation are not accepted;
    continue to record the video while awaiting a response to the first invitation, the second invitation, or both the first invitation and the second invitation;
    in response to receiving the acceptance of the first invitation, convert the video into the live video conversation with the first recipient and recording at least a portion of the live video conversation; and
    in response to not receiving the acceptance of the second invitation, use the recorded portion of the live video conversation with the first recipient as at least part of the asynchronous artifact in a message thread with the second recipient.

7. The medium of claim 6, wherein recording of the video is initiated in response to failure to connect to the live video conversation.

8. The medium of claim 6, further comprising streaming the video to the first recipient or the second recipient while awaiting a response to the first invitation or the second invitation.

9. The medium of claim 6, wherein the first invitation or the second invitation remains open until an instruction to cease recording of the video is received.

10. The medium of claim 6, further comprising receiving a response to the video in the messaging thread.

11. An apparatus comprising:
    a non-transitory computer readable medium configured to store instructions for capturing a video for transmission by a messaging service; and
    a processor configured to execute the instructions, the instructions configured to cause the processor to:
    initiate recording of the video;
    receive an indication of a first recipient and a second recipient for the video, the first and second recipients being members of the messaging service;
    transmit a first invitation to the first recipient and a second invitation to the second recipient to join a live video conversation;
    indicate an intention that:
    i) the video recording become the live video conversation upon receipt of an acceptance of the first invitation, the second invitation, or both the first invitation and the second invitation, and
    ii) become an asynchronous artifact if any of the first invitation or second invitation are is not accepted;
    continue to record the video while awaiting a response to the first invitation, the second invitation, or both the first invitation and the second invitation;
    in response to receiving the acceptance of the first invitation, convert the video into the live video conversation with the first recipient and recording at least a portion of the live video conversation; and
    in response to not receiving the acceptance of the second invitation, use the recorded portion of the live video conversation with the first recipient as at least part of the asynchronous artifact in a message thread with the second recipient.

12. The apparatus of claim 11, wherein recording of the video is initiated in response to failure to connect to the live video conversation.

13. The apparatus of claim 11, further comprising streaming the video to the first recipient or the second recipient while awaiting a response to the first invitation or the second invitation.

14. The apparatus of claim 11, wherein the first invitation or the second invitation remains open until an instruction to cease recording of the video is received.

* * * * *